United States Patent
Nakamura et al.

(10) Patent No.: US 12,446,554 B2
(45) Date of Patent: Oct. 21, 2025

(54) PET STATUS ASSESSMENT SYSTEM, PET CAMERA, SERVER, PET STATUS ASSESSMENT METHOD, AND PROGRAM

(71) Applicant: Panasonic Intellectual Property Management Co., Ltd., Osaka (JP)

(72) Inventors: Yuka Nakamura, Osaka (JP); Hiroaki Omayu, Osaka (JP); Yasushi Uesaka, Hyogo (JP); Masafumi Sato, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 336 days.

(21) Appl. No.: 18/022,074

(22) PCT Filed: Aug. 20, 2021

(86) PCT No.: PCT/JP2021/030654
§ 371 (c)(1),
(2) Date: Feb. 17, 2023

(87) PCT Pub. No.: WO2022/050093
PCT Pub. Date: Mar. 10, 2022

(65) Prior Publication Data
US 2023/0320328 A1    Oct. 12, 2023

(30) Foreign Application Priority Data
Sep. 1, 2020   (JP) ................................. 2020-147129

(51) Int. Cl.
G06K 9/00     (2022.01)
A01K 29/00    (2006.01)
(Continued)

(52) U.S. Cl.
CPC .............. *A01K 29/005* (2013.01); *G06T 7/70* (2017.01); *G06V 10/774* (2022.01); *G06V 20/50* (2022.01);
(Continued)

(58) Field of Classification Search
CPC ............................... G06V 40/10; G06V 10/82
See application file for complete search history.

(56) References Cited

U.S. PATENT DOCUMENTS

2013/0069978 A1   3/2013  Tanaka et al.
2016/0057395 A1   2/2016  Yuki et al.
(Continued)

FOREIGN PATENT DOCUMENTS

CN   106165655 A     11/2016
CN   108922622 B  *   7/2018  ............. G10L 25/66
(Continued)

OTHER PUBLICATIONS

International Search Report dated Nov. 2, 2021 issued in International Patent Application No. PCT/JP2021/030654, with English translation.
(Continued)

*Primary Examiner* — Hadi Akhavannik
(74) *Attorney, Agent, or Firm* — Rimon P.C.

(57) ABSTRACT

A pet status assessment system includes an area detector, an information generator, and an assessor. The area detector detects, in image data, a specific area representing at least a part of appearance of a pet as a subject. The information generator generates pet information. The pet information includes posture information which is based on a learned model and the image data. The learned model has been generated by learning the posture of the pet to recognize, on an image, the posture of the pet. The assessor assesses, based (Continued)

on the pet information, a pet status concerning at least one of an emotion of the pet or an action of the pet.

16 Claims, 10 Drawing Sheets

(51) Int. Cl.
  *G06T 7/70* (2017.01)
  *G06V 10/774* (2022.01)
  *G06V 20/50* (2022.01)
  *G06V 40/10* (2022.01)
(52) U.S. Cl.
  CPC .......... *G06V 40/10* (2022.01); *G06T 2200/24* (2013.01); *G06T 2207/20081* (2013.01)

(56) References Cited

U.S. PATENT DOCUMENTS

| | | | |
|---|---|---|---|
| 2017/0196196 A1* | 7/2017 | Trottier | ................ A01K 15/027 |
| 2019/0174718 A1 | 6/2019 | Venkat et al. | |
| 2020/0203019 A1* | 6/2020 | Leon | ....................... G16H 50/50 |
| 2020/0205382 A1 | 7/2020 | Chen | |
| 2020/0236901 A1* | 7/2020 | Trottier | .................. H04N 7/181 |
| 2021/0065277 A1* | 3/2021 | Bramson | ............ G06Q 30/0631 |

FOREIGN PATENT DOCUMENTS

| | | |
|---|---|---|
| CN | 109566451 A | 4/2019 |
| CN | 111597942 A | 8/2020 |
| JP | 2005-228274 A | 8/2005 |
| JP | 2009-289230 A | 12/2009 |
| JP | 2013-065110 A | 4/2013 |
| JP | 2019-058098 A | 4/2019 |
| JP | 2019-091233 A | 6/2019 |
| JP | 2019-122368 A | 7/2019 |
| JP | 2020-005558 A | 1/2020 |
| JP | 2020-014421 A | 1/2020 |
| JP | 2020-092714 A | 6/2020 |
| WO | 2017/215106 A1 | 12/2017 |

OTHER PUBLICATIONS

International Search Report dated Oct. 19, 2021 issued in International Patent Application No. PCT/JP2021/030653, with English translation.

Chinese Office Action dated Mar. 15, 2025 issued in the corresponding Chinese Patent Application No. 202180050178.5, with English translation of the Search Report.

* cited by examiner

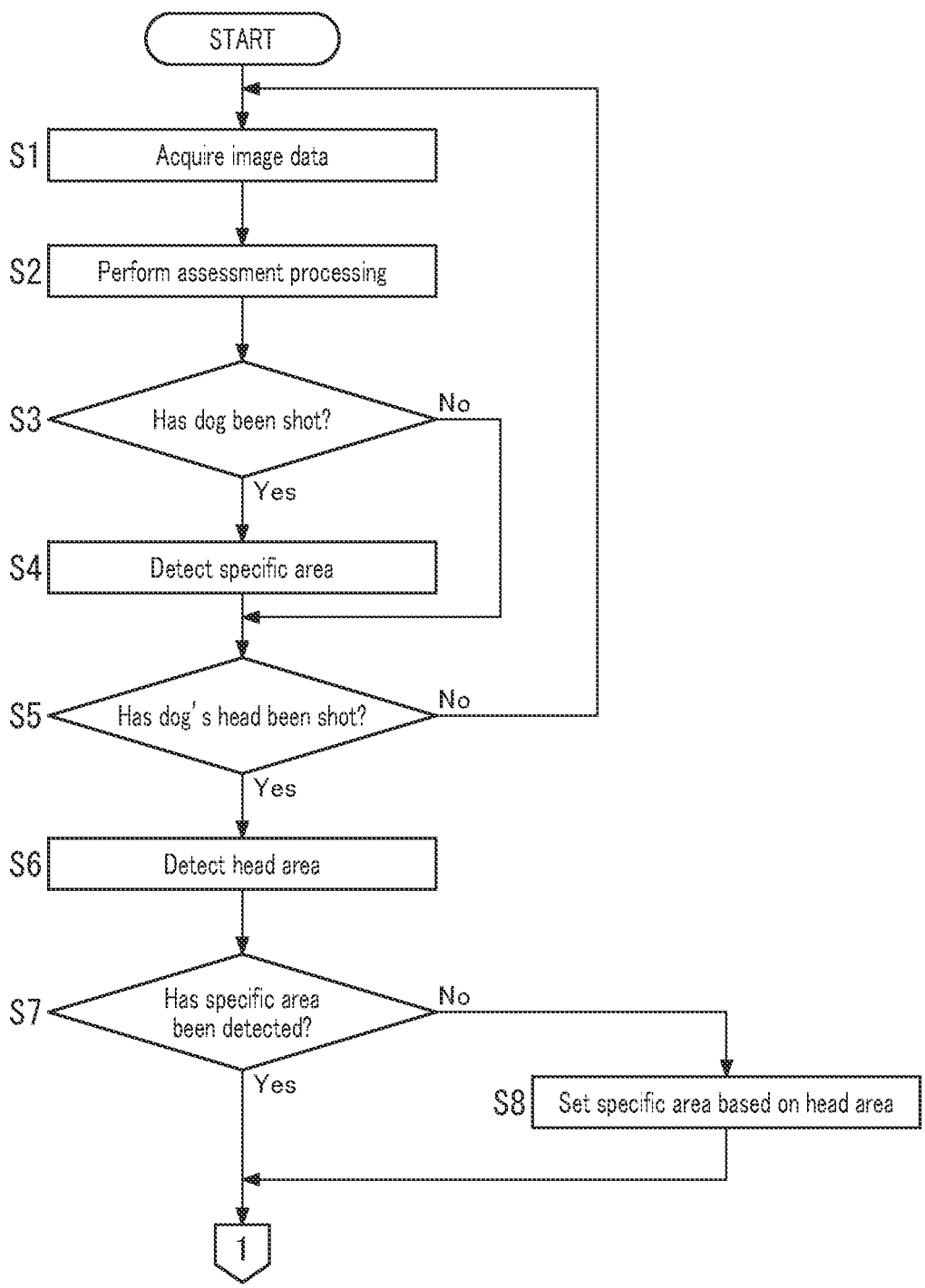

PET STATUS ASSESSMENT SYSTEM, PET CAMERA, SERVER, PET STATUS ASSESSMENT METHOD, AND PROGRAM

CROSS REFERENCE TO RELATED APPLICATIONS

This application is the U.S. National Phase under 35 U.S.C. § 371 of International Patent Application No. PCT/JP2021/030654, filed on Aug. 20, 2021 which in turn claims the benefit of Japanese Patent Application No. 2020-147129, filed on Sep. 1, 2020, the entire disclosures of which Applications are incorporated by reference herein.

TECHNICAL FIELD

The present disclosure generally relates to a pet status assessment system, a pet camera, a server, a pet status assessment method, and a program. More particularly, the present disclosure relates to a pet status assessment system for assessing the status of a pet shot as a subject in image data, a pet camera including the pet status assessment system, a server, a pet status assessment method, and a program.

BACKGROUND ART

Patent Literature 1 discloses a detection device for recognizing and detecting an animal and a person from an image. The detection device includes an animal detector for detecting an animal from an image and a person detector for detecting a person from the image. The detection device further includes a detection result output interface for outputting, when an animal and a person have been both detected, information that a target object has been detected, as a detection result.

In this detection device, the animal detector scans an input image by reference to feature quantity data reflecting the features of an animal stored in an animal feature quantity storage device. If the animal detector 21 has located any area that either matches, or has a high degree of similarity to, the animal's feature quantity data, then the animal detector determines an object shot in the area to be animal.

In general, the user (who may be the owner of a pet, for example) may want to learn about a specific status of a pet (animal) shot in the image data or may want to be notified, if the pet shot in the image data is in a particular status, of the particular status.

CITATION LIST

Patent Literature

Patent Literature 1: JP 2013-65110 A

SUMMARY OF INVENTION

In view of the foregoing background, it is therefore an object of the present disclosure to provide a pet status assessment system, a pet camera, a server, a pet status assessment method, and a program, all of which are configured or designed to make the pet's status recognizable more easily.

A pet status assessment system according to an aspect of the present disclosure includes an area detector, an information generator, and an assessor. The area detector detects, in image data, a specific area representing at least a part of appearance of a pet as a subject. The information generator generates pet information. The pet information includes posture information about at least a posture of the pet. The posture information is based on a learned model and the image data. The learned model has been generated by learning the posture of the pet to recognize, on an image, the posture of the pet. The assessor assesses, based on the pet information, a pet status concerning at least one of an emotion of the pet presented in the specific area or an action of the pet presented in the specific area.

A pet camera according to another aspect of the present disclosure includes the pet status assessment system described above and an image capture device that captures the image data.

A server according to still another aspect of the present disclosure may communicate with a pet camera equipped with the information generator and the assessor of the pet status assessment system described above. The server is equipped with the area detector.

A server according to yet another aspect of the present disclosure may communicate with a pet camera equipped with the area detector of the pet status assessment system described above. The server is equipped with the information generator and the assessor.

A pet status assessment method according to yet another aspect of the present disclosure includes a pet detection step, an information generation step, and an assessment step. The pet detection step includes detecting, in image data, a specific area representing at least a part of appearance of a pet as a subject. The information generation step includes generating pet information. The pet information includes posture information about at least a posture of the pet. The posture information is based on a learned model and the image data. The learned model has been generated by learning the posture of the pet to recognize, on an image, the posture of the pet. The assessment step includes assessing, based on the pet information, a pet status concerning at least one of an emotion of the pet presented in the specific area or an action of the pet presented in the specific area.

A program according to yet another aspect of the present disclosure is designed to cause one or more processors to perform the pet status assessment method described above.

BRIEF DESCRIPTION OF DRAWINGS

FIG. 8 is a flowchart showing an exemplary operation of the pet status assessment system;

DESCRIPTION OF EMBODIMENTS

(1) Overview

The drawings to be referred to in the following description of embodiments are all schematic representations. Thus, the ratio of the dimensions (including thicknesses) of respective constituent elements illustrated on the drawings does not always reflect their actual dimensional ratio.

Figure 1A:
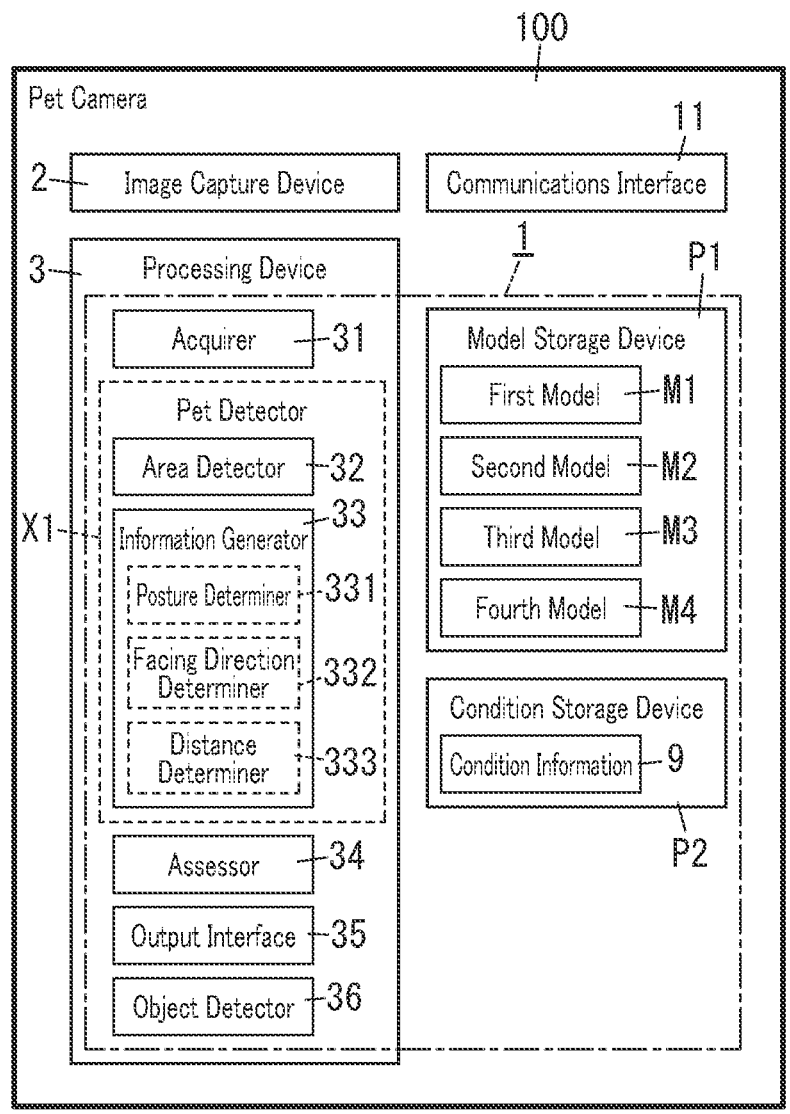
FIG. 1A illustrates a schematic configuration for a pet camera to which a pet status assessment system according to an exemplary embodiment is applied.

A pet status assessment system 1 according to an implementation of an exemplary embodiment includes an area detector 32, an information generator 33, and an assessor 34 as shown in FIG. 1A. The pet status assessment system 1 includes, as a major constituent element thereof, a computer system including one or more processors and one or more memories. In the following description, the respective constituent elements (including the area detector 32, the information generator 33, and the assessor 34) of the pet status assessment system 1 are supposed to be all aggregated together in a single housing of the pet camera 100, as an example. However, this is only an example and should not be construed as limiting. Alternatively, the constituent elements of the pet status assessment system 1 according to the present disclosure may also be distributed in multiple devices. For example, at least some constituent elements of the pet status assessment system 1 may be provided outside of the pet camera 100 (e.g., provided in an external server such as a server 7). For instance, the pet camera 100 may be equipped with the information generator 33 and the assessor 34 and the server 7 with the ability to communicate with the pet camera 100 may be equipped with the area detector 32. Alternatively, the pet camera 100 may be equipped with the area detector 32 and the server 7 with the ability to communicate with the pet camera 100 may be equipped with the information generator 33 and the assessor 34. As used herein, the "server" may be either a single external device (which may also be a device installed in the user's 300 house) or made up of a plurality of external devices, whichever is appropriate.

The area detector 32 detects, in the image data D1 (refer to FIGS. 3B-6), a specific area A1 representing at least a part of the appearance of a pet 5 as a subject H1. In this embodiment, the image data D1 is an image (data) captured (or generated) by an image capture device 2 (refer to FIG. 1A) of the pet camera 100. The image data D1 may be either a still picture or a picture that forms one frame of a moving picture, whichever is appropriate. Alternatively, the image data D1 may also be an image captured by the image capture device 2 and subjected to image processing partially. In the following description, the type of the "pet," of which the status is to be assessed by the pet status assessment system 1, is supposed to be dog (as a type of animal). However, the type of the "pet" is not limited to any particular one but may be cat or any other type of animal as well.

Also, in the following description, the dog (as a pet of interest) shot (specified as a subject) in the image data D1 will be designated by the reference sign "5," while other unspecified dogs (as pets of no interest) will be referred to with no reference sign attached thereto.

In this embodiment, the specific area A1 is an area surrounded with a rectangular frame in the image data D1 and indicated by a "bounding box" that surrounds the pet 5 shot as the subject H1 as shown in FIGS. 3A-6. The location of the pet 5 in the image data D1 may be defined by, for example, the X- and Y-coordinates at the upper left corner of the bounding box and the lateral width and height of the bounding box. However, the specific area A1 does not have to be indicated by the bounding box but may also be indicated by, for example, segmentation that distinguishes the subject H1 from the background on a pixel-by-pixel basis. In the present disclosure, the X-Y coordinates used to determine the location of the pet 5 and a particular object 6 other than the pet 5 in the image data D1 are supposed to be defined on a pixel basis as an example.

The information generator 33 generates pet information. The pet information includes posture information about at least the posture of the pet 5. The posture information is based on a learned model (hereinafter sometimes referred to as a "first model M1") and the image data D1. The learned model has been generated by learning the posture of the pet to recognize, on an image, the posture of the pet. The first model M1 is a model that has been generated by machine learning and is stored in a model storage device P1 (refer to FIG. 1A) of the pet camera 100.

In this embodiment, the area detector 32 and the information generator 33 together form a pet detector X1 (refer to FIG. 1A) for detecting a dog (as a type of pet 5) from the image data D1. Optionally, at least some functions of the information generator 33 may be provided outside of the pet detector X1.

The assessor 34 assesses, based on the pet information, a pet status concerning an emotion and/or action of the pet 5 presented in the specific area A1. In this embodiment, the assessor 34 assesses the pet status based on the pet information and condition information 9 (refer to FIG. 1A) about a particular action and/or particular emotion of the pet. The condition information 9 is stored in a condition storage device P2 (refer to FIG. 1A) of the pet camera 100.

According to this configuration, the assessor 34 assesses, based on the pet information, a pet status concerning an emotion and/or action of the pet 5, thus eventually making it easier to recognize the status of the pet 5.

A pet status assessment method according to another implementation of the exemplary embodiment includes a pet detection step, an information generation step, and an assessment step. The pet detection step includes detecting, in image data D1, a specific area A1 representing at least a part of appearance of a pet 5 as a subject H1. The information generation step includes generating pet information. The pet information includes posture information about at least a posture of the pet 5. The posture information is based on a learned model M1 and the image data D1. The learned model M1 has been generated by learning the posture of the pet to recognize, on an image, the posture of the pet. The assessment step includes assessing, based on the pet information, a pet status concerning an emotion and/or action of the pet 5 presented in the specific area A1.

According to this method, the assessment step includes assessing, based on the pet information, a pet status concerning an emotion and/or action of the pet 5, thus eventually making it easier to recognize the status of the pet 5.

The pet status assessment method is used on a computer system (pet status assessment system 1). That is to say, the pet status assessment method may also be implemented as a program. A program according to this embodiment is designed to cause one or more processors to perform the pet status assessment method according to this embodiment.

(2) Details

Next, a system to which the pet status assessment system 1 according to this embodiment is applied (hereinafter referred to as a "pet management system 200") will be described in detail with reference to FIGS. 1A-9.

(2.1) Overall Configuration

Figure 2:
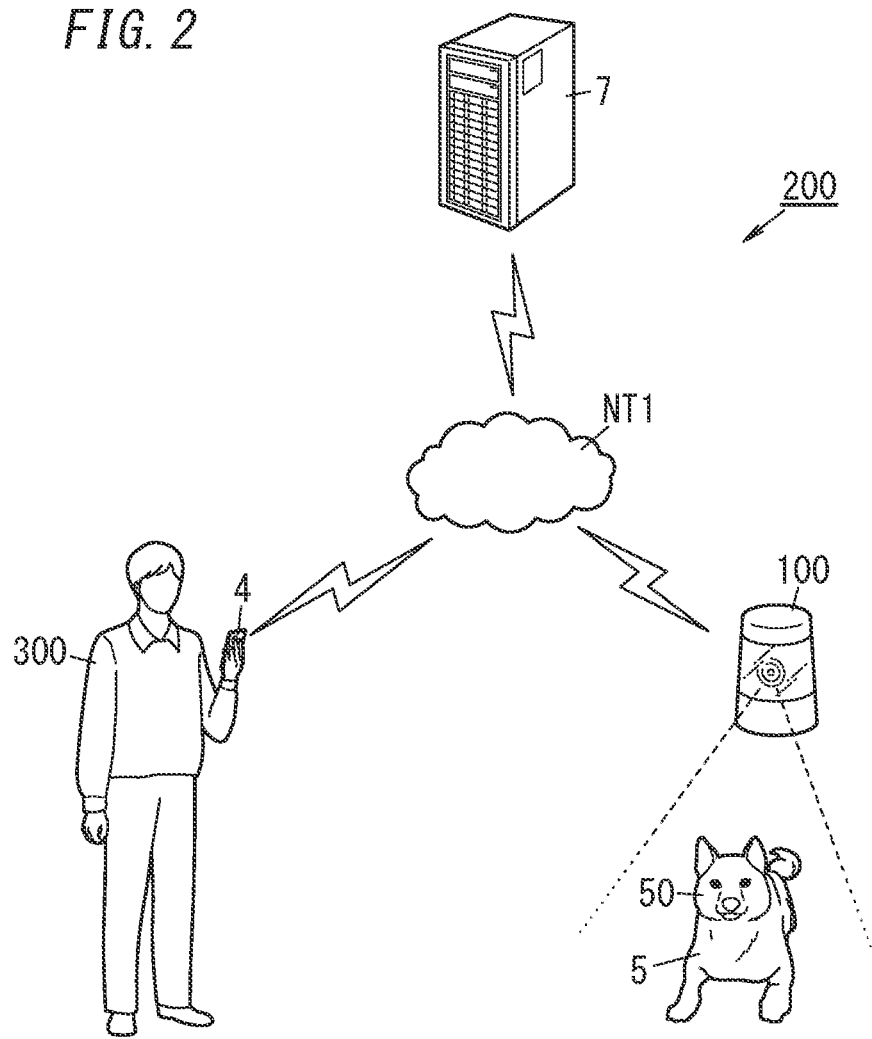
FIG. 2 is a conceptual diagram illustrating an overall configuration for a pet management system including the pet status assessment system.

As shown in FIG. 2, the pet management system 200 includes one or more pet cameras 100, one or more presentation devices 4, and a server 7. In the following description, attention will be paid to a user 300 (refer to FIG. 2) who receives the pet 5 management (or watching) services using this pet management system 200. The user 300 may be, but does not have to be, the owner of the pet 5.

The user 300 installs one or more pet cameras 100 at predetermined location(s) in a facility (such as a dwelling facility where the user 300 lives with the pet 5). If a plurality of pet cameras 100 are to be installed, the user 300 may install one pet camera 100 in each room of the dwelling facility. The pet camera 100 does not have to be installed indoors but may also be installed outdoors. In the following description, attention will be paid to one pet camera 100 for the sake of convenience of description.

The presentation device 4 is supposed to be, for example, a telecommunications device owned by the user 300. The telecommunications device is supposed to be, for example, a mobile telecommunications device such as a smartphone or a tablet computer. Alternatively, the presentation device 4 may also be a laptop computer or a desktop computer.

Figure 1B:
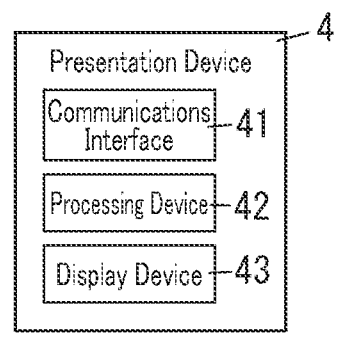
FIG. 1B illustrates a schematic configuration for a presentation device communicating with the pet camera.

As shown in FIG. 1B, the presentation device 4 includes a communications interface 41, a processing device 42, and a display device 43.

The communications interface 41 is a communications interface that allows the communications interface 41 to communicate with each of the pet camera 100 (refer to FIG. 2) and the server 7 (refer to FIG. 2). Alternatively, the communications interface 41 may be configured to communicate with only the pet camera 100 or the server 7.

The processing device 42 is implemented as, for example, a computer system including one or more processors (microprocessors) and one or more memories. That is to say, the respective functions of the processing device 42 are performed by making the one or more processors execute one or more programs (applications) stored in one or more memories. In this embodiment, the program is stored in the memory of the processing device 42. Alternatively, the program may also be downloaded via a telecommunications line such as the Internet or distributed after having been stored in a non-transitory storage medium such as a memory card. The user 300 may make his or her telecommunications device function as the presentation device 4 by installing an application software program dedicated to presenting a graphical user interface (GUI) about the pet 5 to watch (hereinafter referred to as a "pet app") and starting the pet app.

The display device 43 may be implemented as a touch-screen panel liquid crystal display or organic electroluminescent (EL) display. As the presentation device 4 executes the pet app, a screen image presenting information about the pet 5 is displayed (output) on the display device 43.

If multiple residents (family members) live in the dwelling facility with the pet 5 and receive the pet 5 management services as the users 300, then the pet management system 200 includes a plurality of presentation devices 4 respectively carried by the multiple residents (multiple users 300) with them. In the following description, attention will be paid to one presentation device 4 (smartphone) carried by one user 300 (resident) with him or her.

The pet camera 100 is a device having the capability of capturing an image to watch the specified pet, for example. In other words, the pet camera 100 includes the image capture device 2 (camera device) as shown in FIG. 1A. The user 300 installs the pet camera 100 such that a region where his or her own pet 5 mainly acts everyday (e.g., a place where a feed is put) inside (or outside) the dwelling facility falls within the angle of view of the image capture device 2. This allows the user 300 to watch, through the image captured by the image capture device 2, the status of the pet 5 even while he or she is away from the dwelling facility, for example.

As described above, the type of the pet to watch is supposed to be dog as an example. Although multiple frames of image data D1 representing dogs of multiple breeds are illustrated as examples in FIGS. 3-6A, these drawings just illustrate various postures that dogs may assume to describe the operation of the pet status assessment system 1 and should not be construed as limiting the breeds of dogs to which this pet status assessment system 1 is applicable. The pet status assessment system 1 is configured to recognize, for example, the posture of any dog in the same way to a certain degree irrespective of its breed. However, this is only an example and should not be construed as limiting. Alternatively, the pet status assessment system 1 may also recognize the posture of a given dog on an individual basis according to its breed.

As shown in FIG. 1A, the pet camera 100 further includes a communications interface 11 in addition to the image capture device 2. The communications interface 11 is a communications interface that allows the communications interface 11 to communicate with each of the presentation device 4 (refer to FIG. 2) and the server 7 (refer to FIG. 2). Optionally, the communications interface 11 may have the capability of establishing a short-range wireless communication with the presentation device 4 in compliance with the Bluetooth® Low Energy (BLE) standard, for example. If the user 300 (refer to FIG. 2) who carries the presentation device 4 with him or her is staying home, the communications interface 11 may transmit and receive data to/from the presentation device 4 by directly establishing a short-range wireless communication with the presentation device 4.

In addition, the communications interface 11 is also connected to a network NT1 (refer to FIG. 2) such as the Internet via a router installed inside the dwelling facility. The pet camera 100 may communicate with the external server 7 via the network NT1 to acquire and output information from/to the server 7.

Optionally, the presentation device 4 shown in FIG. 2 may also be connected to the network NT1 via, for example, a cellular phone network (carrier network) provided by a communications service provider or a public wireless local area network (LAN). Examples of the cellular phone network include the third generation (3G) network, the long-term evolution (LTE) network, the fourth generation (4G) network, and the fifth generation (5G) network. In an environment where the presentation device 4 is connectible to the cellular phone network, the presentation device 4 may be connected to the network NT1 via the cellular phone network. For example, if the user 300 who carries the presentation device 4 with him or her is away from home, the presentation device 4 is allowed to communicate with each of the pet camera 100 and the server 7 when connected to the network NT1 via the cellular phone network.

Optionally, the communication between the presentation device 4 and the pet camera 100 may be established via the network NT1 and the server 7.

As described above, the pet status assessment system 1 is provided for the pet camera 100 as shown in FIG. 1A. Specifically, as shown in FIG. 1A, the pet camera 100 further includes a processing device 3, a model storage device P1, and a condition storage device P2, which together form the pet status assessment system 1. The pet status assessment system 1 will be described in further detail later in the next section.

As shown in FIG. 2, the server 7 is connected to the network NT1. The server 7 may communicate with each of the pet camera 100 and the presentation device 4 via the network NT1. The server 7 manages, for example, user information (such as his or her name, user ID, phone number, and email address), information (such as identification information) about the pet camera 100 and presentation device 4 owned by the user 300, and information about the pet 5 (such as information about its dog breed) owned by the user 300. In addition, the server 7 also collects and accumulates various image data captured by a plurality of pet cameras 100 and processing results (in particular, processing errors). Optionally, the user 300 may download the pet app by accessing the server 7 via the presentation device 4.

In this embodiment, the server 7 is supposed to be a single server device. However, this is only an example and should not be construed as limiting. Alternatively, the server 7 may also be made up of a plurality of server devices, which may form a cloud computing system, for example. Optionally, at least some functions of the pet status assessment system 1 may be provided inside the server 7.

(2.2) Pet Status Assessment System

As shown in FIG. 1A, the pet camera 100 includes not only the image capture device 2 and the communications interface 11 but also the processing device 3, the model storage device P1, and the condition storage device P2 as the pet status assessment system 1 as described above. The pet status assessment system 1 performs "assessment processing" for assessing the pet status.

The model storage device P1 is configured to store data including a plurality of learned models. The model storage device P1 includes a rewritable memory such as an electrically erasable programmable read-only memory (EEPROM). Meanwhile, the condition storage device P2 is configured to store data including condition information 9. The condition storage device P2 includes a rewritable memory such as an EEPROM. The model storage device P1 and the condition storage device P2 may be the same storage device (memory). Optionally, the model storage device P1 and the condition storage device P2 may also be a memory built in the processing device 3.

The processing device 3 is implemented as, for example, a computer system including one or more processors (microprocessors) and one or more memories. That is to say, the respective functions of the processing device 3 (to be described later) are performed by making the one or more processors execute one or more programs (applications) stored in one or more memories. In this embodiment, the program is stored in the memory of the processing device 3. Alternatively, the program may also be downloaded via a telecommunications line such as the Internet or distributed after having been stored in a non-transitory storage medium such as a memory card.

The processing device 3 has the function of a controller for performing overall control on the pet camera 100, i.e., controlling the image capture device 2, the communications interface 11, the model storage device P1, the condition storage device P2, and other components.

In this embodiment, the processing device 3 includes an acquirer 31, the area detector 32, the information generator 33, the assessor 34, an output interface 35, and an object detector 36 as shown in FIG. 1A. In this embodiment, the area detector 32 and the information generator 33 together form the pet detector X1 for detecting a dog (as a type of pet 5) from the image data D1 as described above.

The acquirer 31 is configured to acquire image data D1 (such as a still picture) from the image capture device 2. The acquirer 31 may acquire, as the image data D1, an image as one frame of a moving picture from the image capture device 2. When the acquirer 31 acquires the image data D1, the processing device 3 performs assessment processing.

The area detector 32 of the pet detector X1 is configured to detect, in the image data D1, a specific area A1 representing at least a part of the appearance of the pet 5 as a subject H1. In this embodiment, the area detector 32 detects the specific area A1 based on a learned model (hereinafter sometimes referred to as a "second model M2"). The second model M2 has been generated by learning an appearance factor (feature quantity) of a predetermined type of pet (e.g., a dog in this example) to recognize, on the image, the predetermined type of pet. The second model M2 is stored in the model storage device P1.

The second model M2 may include, for example, either a model that uses a neural network or a model generated by deep learning using a multilayer neural network. Examples of the neural networks (including a multilayer neural network) may include a convolutional neural network (CNN) and a Bayesian neural network (BNN). The second model M2 may be implemented by, for example, installing a learned neural network into an integrated circuit such as an application specific integrated circuit (ASIC) or a field-programmable gate array (FPGA). However, the second model M2 does not have to be a model generated by deep learning. Alternatively, the second model M2 may also be a model generated by a support vector machine or a decision tree, for example.

In short, the area detector 32 determines, using the second model M2, whether or not any dog (as a type of pet 5) is present as a subject H1 in the image data D1 acquired. When determining that a dog (as a type of pet 5) be present in the image data D1, the area detector 32 detects a specific area A1 (refer to FIGS. 3A-6) defined by the bounding box that surrounds the pet 5. However, the specific area A1 does not have to be defined by the bounding box but may also be defined by segmentation, for example.

The area detector 32 detects, based on a learned model (hereinafter sometimes referred to as a "third model M3"), a head area A2 (refer to FIGS. 3A-6) representing a head region 50 (refer to FIG. 2) of the subject H1. The third model M3 has been generated by learning an appearance factor (feature quantity) of the head region of a predetermined type of pet (e.g., a dog in this example) to recognize, on the image, the head region of the predetermined type of pet. That is to say, the area detector 32 further has the function of a head region detector for detecting, using the third model M3, the head area A2 covering the facial part. Alternatively, the area detector 32 and the head region detector may be provided separately from each other. The third model M3 is stored in the model storage device P1.

The third model M3, as well as second model M2, may include, for example, either a model that uses a neural network or a model generated by deep learning using a multilayer neural network. Nevertheless, the third model M3 does not have to be a model generated by deep learning. Optionally, the third model M3 may be the same model as the second model M2.

The area detector 32 determines, using the third model M3, whether or not the head region 50 of the dog (as a type of pet 5) is present in the image data D1. When determining that the head region 50 of the dog (as a type of pet 5) be present in the image data D1, the area detector 32 detects a head area A2 (refer to FIGS. 3A-6) defined by the bounding box that surrounds the head region 50. However, the head area A2 does not have to be defined by the bounding box but may also be defined by segmentation, for example.

If the image data D1 is an image representing, as a closeup, a part (such as the face) of the appearance of the dog (as a type of pet 5), then either detection of the specific area A1 or detection of the head area A2 may fail (i.e., either the specific area A1 or the head area A2 may be detected erroneously). Specifically, the image data D1 representing, as a closeup, the face of the dog (as a type of pet 5) is substantially an annotation concerning a "dog's face." Thus, even if the area detector 32 has detected the head area A2 as the dog's face (head region 50) successfully, the head area A2 may fail to provide annotation to the dog as a whole (i.e., the entire appearance thereof). As a result, chances are that the area detector 32 fails to detect the specific area A1 as the dog. In this embodiment, if the area detector 32 has detected at least one of the dog or the dog's face, then the area detector 32 presumes that the dog (as a type of pet 5) be present in the image data D1 acquired. If the area detector 32 has detected only the head area A2, then the area detector 32 sets, as the specific area A1, an area substantially equal in size to the head area A2. Note that if the area detector 32 has failed to detect the head area A2 even though the area detector 32 has detected the specific area A1, the processing device 3 may end the assessment processing about the image data D1.

The information generator 33 of the pet detector X1 generates pet information based on not only a learned model (first model M1) generated by learning the posture of the pet (e.g., a dog in this example) to recognize, on the image, the posture of the pet but also the image data D1 in which the specific area A1 has been detected. The pet information includes posture information about at least the posture of the pet 5 presented in the specific area A1.

Specifically, the information generator 33 includes a posture determiner 331, a facing direction determiner 332, and a distance determiner 333.

The posture determiner 331 is configured to determine (assess) the posture of the dog (as a type of pet 5) based on the first model M1 and information about the specific area A1. The first model M1 has been generated by learning an appearance factor (feature quantity) of the dog's posture to recognize, on the image, the dog's posture.

The first model M1, as well as the second model M2 and the third model M3, may include, for example, either a model that uses a neural network or a model generated by deep learning using a multilayer neural network. Nevertheless, the first model M1 does not have to be a model generated by deep learning. Optionally, the first model M1 may be the same model as the second model M2 and the third model M3.

Next, the posture of the dog (as a type of pet 5) will be described with reference to FIGS. 3A-6, each of which illustrates an exemplary frame of the image data D1 that may be subjected to the assessment processing by the pet status assessment system 1.

Figure 3A:
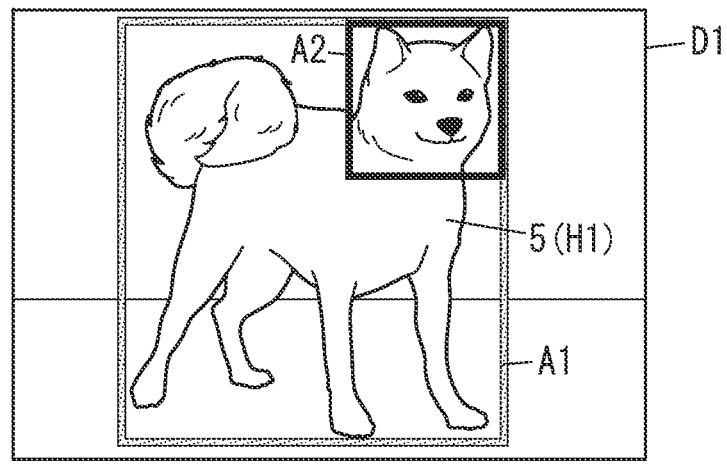
FIGS. 3A-3C illustrate examples of image data to be subjected to assessment processing by the pet status assessment system.

FIG. 3A is an exemplary frame of the image data D1 representing how the pet 5 is assuming a posture (first posture) of standing on all four legs to watch its surroundings.

Figure 3B:
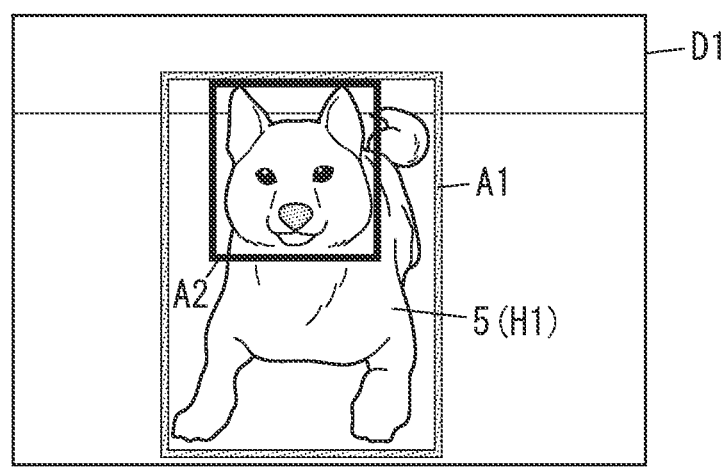

FIG. 3B is another exemplary frame of the image data D1 representing how the pet 5 is assuming a posture (second posture) of lying down on the floor to face straight forward and watch its surroundings.

Figure 3C:
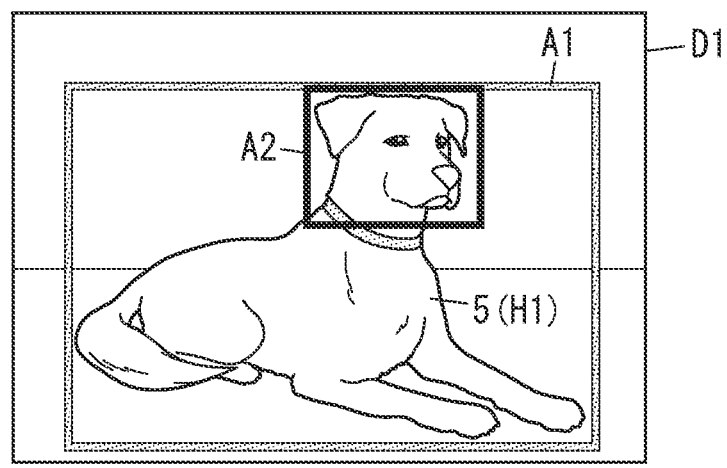

FIG. 3C is still another exemplary frame of the image data D1 representing how the pet 5 is assuming the second posture of facing slightly to the right and watching its surroundings.

Figure 4A:
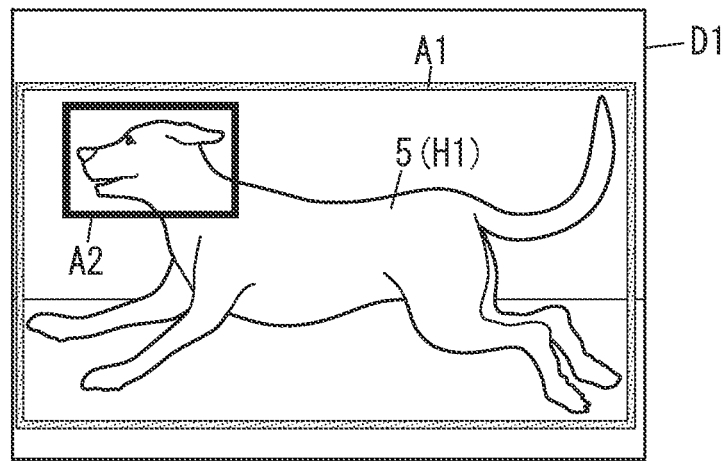
FIGS. 4A-4C illustrate other examples of image data to be subjected to the assessment processing by the pet status assessment system.

FIG. 4A is yet another exemplary frame of the image data D1 representing how the pet 5 is assuming a posture (third posture) of running with its forelegs stretched forward and its hind legs stretched backward. In FIG. 4A, the pet 5 is holding its tail up.

Figure 4B:
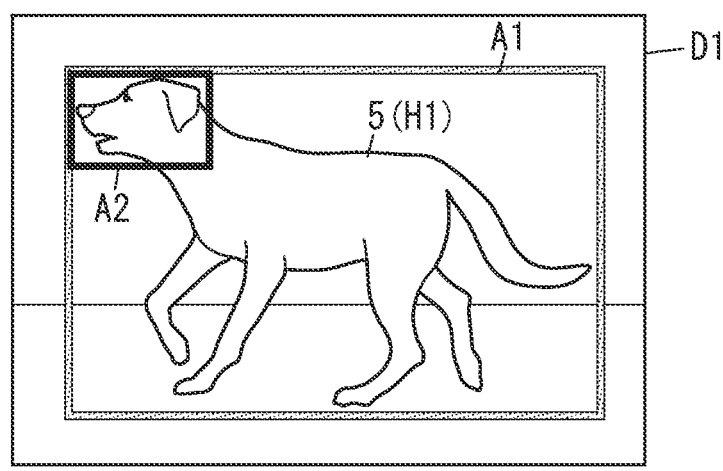

FIG. 4B is yet another exemplary frame of the image data D1 representing how the pet 5 is assuming a posture (fourth posture) of walking with one of its forelegs and one of its hind legs put on the floor and with the other foreleg of its and the other hind leg of its bent and off the floor. In FIG. 4B, the pet 5 is holding its tail down.

Figure 4C:
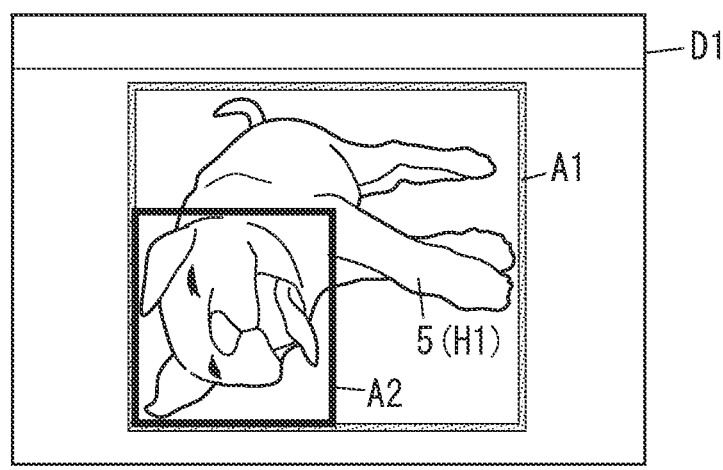

FIG. 4C is yet another exemplary frame of the image data D1 representing how the pet 5 is assuming a posture (fifth posture) of rolling over on the floor and sleeping with its eyes closed.

Figure 5A:
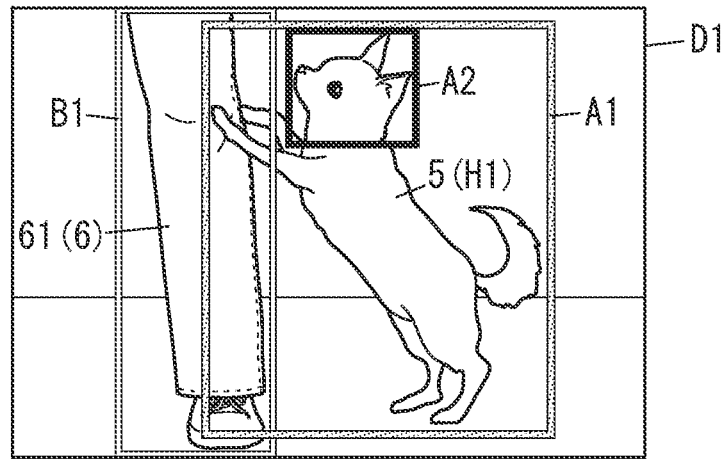
FIGS. 5A-5C illustrate still other examples of image data to be subjected to the assessment processing by the pet status assessment system.

FIG. 5A is yet another exemplary frame of the image data D1 representing how the pet 5 is assuming a posture (sixth posture) of standing on only its hind legs to jump at a person (such as the user 300) and show its affection for him or her.

Figure 5B:
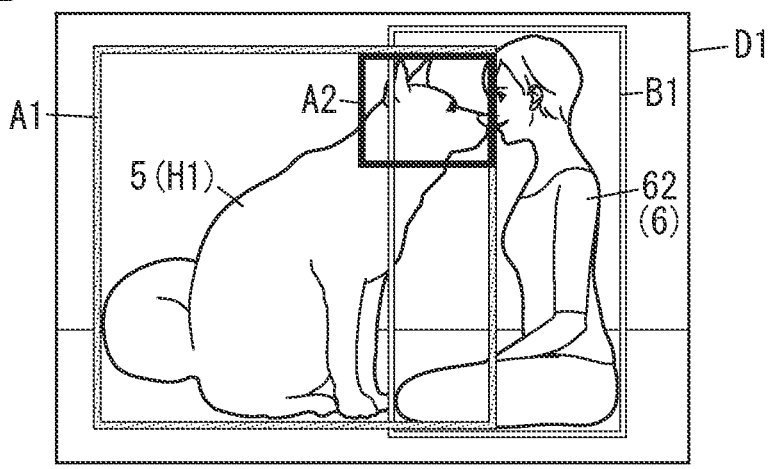

FIG. 5B is yet another exemplary frame of the image data D1 representing how the pet 5 is assuming a posture (seventh posture) of sitting on the floor to face a person (such as the user 300) and showing its affection for him or her.

Figure 5C:
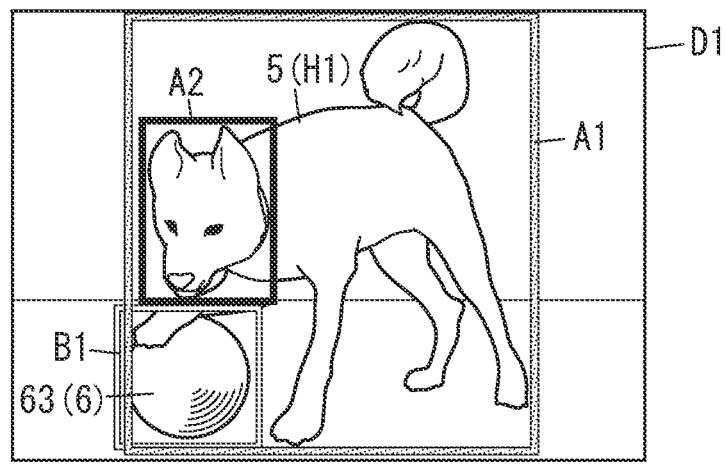

FIG. 5C is yet another exemplary frame of the image data D1 representing how the pet 5 is assuming a posture (eighth posture) of standing on three legs with one of its forelegs off the floor to play with a toy 63 (e.g., a ball in the example illustrated in FIG. 5C).

Figure 6:
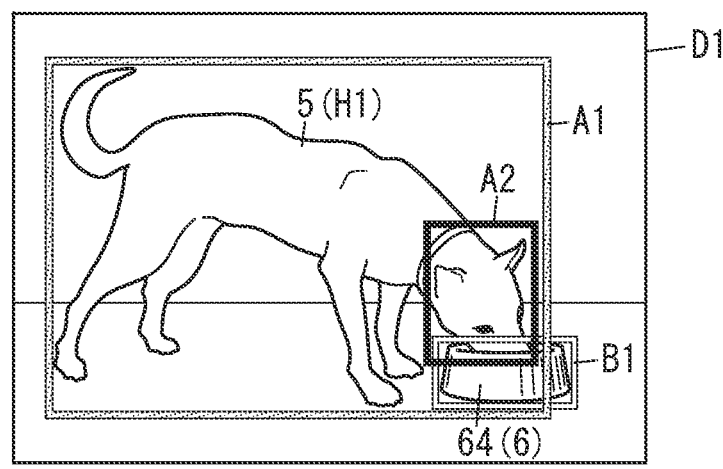
FIG. 6 illustrates yet another example of image data to be subjected to the assessment processing by the pet status assessment system.

FIG. 6 is yet another exemplary frame of the image data D1 representing how the pet 5 is assuming a posture (ninth posture) of standing on all four legs with its head region 50 lowered to eat the feed in the bowl 64.

Note that the first to ninth postures described above are only exemplary postures that the dog (as a type of pet 5) may assume and should not be construed as limiting. Nevertheless, the first model M1 is generated by making machine learning about postures of the dog, more specifically, postures of the dog that are highly correlated to some actions of the dog (in particular, actions related to some types of emotions). As for particular postures of the dog that need to be assessed more accurately, among various postures of the dog, machine learning is made to distinguish various mental and physical conditions of the dog even more finely. As used herein, the "particular posture" refers to a posture that is correlated to an action deeply associated with some emotion of the dog. Examples of the dog's emotion that may be read from its actions include happiness, anger, loneliness, ease, fear, and relaxation. Some actions correlated to particular postures of the dog may be associated with any of these emotions.

For example, if the pet 5 is assuming the first posture, i.e., standing on all four legs, machine learning is made to assess the pet's 5 first posture more finely by determining whether or not the pet 5 is showing its teeth or tongue and by determining whether its ears are up or down. For example, the first posture of the pet 5 showing its teeth is correlated to an action of "threatening." The first posture of the pet 5 holding its ears up is correlated to an action of "watching", more specifically, watching its surroundings, while the first posture of the pet 5 holding its ears down is correlated to an action of "non-watching." The action of "threatening" may be set as an action associated with "anger" which is one of the dog's emotions. The action of "watching" may be set as an action associated with "fear" which is another one of the dog's emotions. Furthermore, the action of "non-watching" may be set as an action associated with "loneliness" or "relaxation" which are other ones of the dog's emotions. Also, if the pet 5 is assuming the fifth posture, i.e., sleeping, machine learning is made to assess the pet's 5 fifth posture more finely by determining exactly how the pet 5 is sleeping, specifically, whether the pet 5 is sleeping with its back arched or straight, with its eyes closed or opened, and with its tongue hanging out or not.

When annotation work is performed (i.e., when supervised data is determined) by attaching tags to the image data (original data) to prepare a learning data set for generating the first to third models M1-M3, a huge number of image data are used. The learning data set is selected from a great many image data that have been collected without restriction in terms of dog's breed, dog's hair color, dog's facing direction, and the background on which the dog has been shot. The learning data set may include not only image data of real dogs but also image data of stuffed dogs and image data of dogs generated by CG. Machine learning is made using these types of image data in combination.

The information about the pet's 5 posture (including the results of determination and information about the specific area A1) determined by the posture determiner 331 is output to the distance determiner 333.

The facing direction determiner 332 is configured to determine (measure), based on the image data D1 in which the specific area A1 has been detected, the direction that the pet 5 is facing in the image data D1. That is to say, the pet information further includes the result of determination made by the facing direction determiner 332. The facing direction determiner 332 receives, from the area detector 32, information about the specific area A1 detected and information about the head area A2 detected. The facing direction determiner 332 may determine the facing direction of the pet 5 as the subject H1 based on only the information about the specific area A1 detected by the area detector 32. In this embodiment, the facing direction determiner 332 determines the facing direction of the pet 5 based on information about the specific area A1 and the information about the head area A2.

In particular, in this embodiment, the facing direction determiner 332 determines the pet's 5 facing direction based on at least the relative location of the head area A2 with respect to the specific area A1. Specifically, the facing direction determiner 332 acquires information about the location and size of the pet 5 in the image data D1 via the specific area A1 detected by the area detector 32. In addition, the facing direction determiner 332 also acquires information about the location and size of the head region 50 of the pet 5 in the image data D1 via the head area A2 detected by the area detector 32.

For example, in the example illustrated in FIG. 3A, the head area A2 is located at the upper right corner of the specific area A1, and therefore, the facing direction determiner 332 determines that the pet 5 be facing generally to the right. On the other hand, in the example illustrated in FIG. 3B, the head area A2 is located in the middle in the rightward/leftward direction at the top of the specific area A1, and therefore, the facing direction determiner 332 determines that the pet 5 be facing generally straight forward. The facing direction determiner 332 locates a point at which the pet 5 is looking (or its range) in the image data D1 and outputs its location information as the result of determination.

The facing direction determiner 332 may determine the pet's 5 facing direction while taking, into account, not only the relative location of the head area A2 with respect to the specific area A1 but also the proportion in planar area of the head area A2 with respect to the specific area A1 and respective locations of the pet's 5 eyes, nose, mouth, and other facial parts in the head area A2, for example. This would further increase the reliability of determination.

The information (i.e., result of determination) about the pet's 5 facing direction thus determined by the facing direction determiner 332 is output to the assessor 34.

The distance determiner 333 is configured to determine (measure) the relative distance between the pet 5 and an object area B1 (to be described later) (hereinafter sometimes referred to as a "pet-object distance"). That is to say, the pet information further includes a result of determination made by the distance determiner 333 (i.e., information about the pet-object distance). In other words, an object (particular object 6) other than the dog (as a type of pet 5) may have been shot as a part of the subject in the image data D1.

In the example shown in FIG. 5A, a person's leg 61 has been shot as the particular object 6. In the example shown in FIG. 5B, the entire appearance 62 of a person sitting on her heels on the floor has been shot as the particular object 6. In the example shown in FIG. 5C, the dog's toy 63 has been shot as the particular object 6. In the example shown in FIG. 6, the bowl 64 containing the dog's feed has been shot as the particular object 6.

Next, the object detector 36 will be described. The object detector 36 is configured to detect an object area B1 representing, in the image data D1, a particular object 6 other than the pet 5. In this embodiment, the object detector 36 detects the object area B1 based on a learned model (hereinafter sometimes referred to as a "fourth model M4") generated by learning an appearance factor (feature quantity) of a predetermined type of particular object to recognize, on the image, the predetermined type of particular object.

The fourth model M4, as well as the first to third models M1-M3, may include, for example, either a model that uses a neural network or a model generated by deep learning using a multilayer neural network. Nevertheless, the fourth model M4 does not have to be a model generated by deep learning. Optionally, the fourth model M4 may be the same model as the first model M1, the second model M2, or the third model M3.

In this case, the fourth model M4 is generated by making machine learning about a particular object which is highly correlated to some action of the dog (in particular, its action associated with some emotion of the dog). For example, if the particular object 6 is either a part of a person (such as the leg 61) or all of the person (such as the entire appearance 62), then it is highly likely that the pet 5 is making an action associated with some emotion. On the other hand, if the particular object 6 is the toy 63 or the bowl 64, then it is highly likely that the pet 5 is making an action of "playing" or an action of "eating." In other words, as the learning data set for generating the fourth model M4, image data where an object in which the dog is often interested has been shot as the particular object is selected among a huge number of image data where objects other than the dog have been shot. The learning data set includes not only image data of real objects but also image data of objects generated by CG as well. The machine learning is made using these types of image data in combination. In this case, the particular object is defined to be an object other than the dog. Thus, objects in which the dog is often interested may also include other types of animals (such as cats).

The object detector 36 determines, using the fourth model M4, whether or not any particular object 6 is present in the image data D1. When determining that any particular object 6 be present in the image data D1, the object detector 36 detects an object area B1 (refer to FIGS. 5A-6) defined by the bounding box that surrounds the particular object 6. However, the object area B1 does not have to be defined by the bounding box but may also be defined by segmentation, for example. Note that the object detector 36 regards an object not corresponding to the particular object 6 as the "background."

The object detector 36 outputs information about the object area B1 detected (including information about the type of the particular object 6) to the distance determiner 333. If no particular object 6 is present in the image data D1 and no object area B1 has been detected there, then the object detector 36 notifies the distance determiner 333 to that effect.

The distance determiner 333 determines the pet-object distance based on the information about the head area A2 detected by the area detector 32, the information about the object area B1 detected by the object detector 36, and the information about the pet's 5 posture determined by the posture determiner 331.

Specifically, the distance determiner 333 determines, based on the distance from the location of the object area B1 (which may be either the location of its upper left corner or its center of gravity) to the location of the pet 5, which of the following three distance relations the pet-object distance has, for example. In this case, the three distance relations are supposed to represent a first distance status (corresponding to a very short distance), a second distance status (corresponding to a relatively short distance), and a third distance status (corresponding to a relatively long distance). The first, second, and third distance statuses may be classified based on, for example, the number of pixels. In this example, three distance relations are set. However, this is only an example and should not be construed as limiting. Alternatively, the number of distance relations may also be two or four or more. Still alternatively, the distance relation may also be borderless (on a pixel basis). In this example, the "location of the pet 5" is supposed to be defined by the location of the head area A2 (which may be its upper left corner location or its center of gravity location). However, this is only an example and should not be construed as limiting. Alternatively, the "location of the pet 5" may also be defined by the location of the specific area A1 (which may be its upper left corner location or its center of gravity location).

The distance determiner 333 preferably determines the pet-object distance while further taking, into account, the degree (or area) of overlap between the object area B1 and the head area A2 (or the specific area A1).

Meanwhile, even if the pet 5 is actually not interested in the particular object 6, the pet 5 and the particular object 6 may be arranged in the depth direction and may have been shot in the image data D1 to overlap with each other. If the distance determiner 333 determined the pet-object distance based on only the distance from the location of the particular object 6 to the location of the pet 5 in the image data D1, then the distance determiner 333 would determine that the pet-object distance be the first distance status even though the pet 5 is actually not making any action correlated to the particular object 6. Thus, the distance determiner 333 determines, while taking, into account, the information about the posture of the pet 5 determined by the posture determiner 331 as well, which of the first, second, and third distance statuses the pet-object distance corresponds to.

For example, even if the particular object 6 is the bowl 64 and the distance from the location of the bowl 64 to the location of the pet 5 is in the first distance status but the pet 5 is not assuming the posture of lowering its head region 50, the distance determiner 333 may regard this frame of the image data D1 as representing the third distance status. Alternatively, the distance determiner 333 may regard this frame of the image data D1 as an outlier and end the assessment processing.

The distance determiner 333 outputs the result of determination about the pet-object distance, information about the head area A2, and the posture information to the assessor 34.

If the object detector 36 has detected no object areas B1, then the distance determiner 333 skips the step of determining the pet-object distance and outputs the information about the head area A2 and the posture information to the assessor 34.

In this embodiment, the pet detector X1 performs the processing of detecting the specific area A1 using the area detector 32 and the processing of generating the pet information using the information generator 33 in this order. However, this is only an example and should not be construed as limiting. Alternatively, the pet detector X1 may perform the detection processing and the generation processing substantially in parallel with each other.

The assessor 34 is configured to assess, based on the pet information, a pet status concerning an emotion and/or action of the pet 5 presented in the specific area A1. In this example, the assessor 34 assesses the pet status based on the pet information and the condition information 9.

As described above, the pet information includes the posture information about the pet's 5 posture determined by the posture determiner 331, the information about the pet's 5 facing direction determined by the facing direction determiner 332, and the information about the pet-object distance determined by the distance determiner 333.

As used herein, the condition information 9 is information about a particular action and/or particular emotion of the pet 5 that has been specified in advance as the target to extract. For example, pieces of information about the correspondences shown in the following Tables 1-4 (hereinafter sometimes referred to as "patterns") are exemplary pieces of the condition information 9. A large number of such patterns are prepared and stored as a database in the condition storage device P2.

TABLE 1

| | Distance to object (bowl) | Pet's posture | Pet's facing direction |
|---|---|---|---|
| Conditions | First distance status | Standing on four legs and lowering head region | Facing toward bowl |
| Action/emotion | | Eating/Delicious | |

TABLE 2

| | Distance to object (person) | Pet's posture | Pet's facing direction |
|---|---|---|---|
| Conditions | First or second distance status | Standing on only hind legs | Facing toward person |
| Action/emotion | | Jumping and showing affection/Happy | |

TABLE 3

| | Distance to object (person) | Pet's posture | Pet's facing direction |
|---|---|---|---|
| Conditions | Third distance status | Standing on four legs and showing teeth | Facing toward person |
| Action/emotion | | Threatening/Angry | |

TABLE 4

| | Distance to object (toy) | Pet's posture | Pet's facing direction |
|---|---|---|---|
| Conditions | First or second distance status | Standing with one foreleg off floor | Facing toward toy |
| Action/emotion | | Playing/Having fun | |

The assessor 34 searches the condition information 9 for any combination of conditions (pattern) that matches the pet information acquired. Note that at that time, the assessor 34 determines, based on the information about the pet's 5 facing direction and the information about the object area B1, whether or not the pet 5 is facing toward the particular object 6 (e.g., whether or not the object area B1 is present on the pet's 5 line of sight) and searches the condition information 9 with that result of determination also taken into account.

For example, suppose the pet information acquired (with the result of determination also taken into account) includes the three results, namely, "first distance status," "standing on four legs and lowering head region," and "facing toward bowl." The assessor 34 searches the condition information 9 for any combination of conditions (pattern) that matches these results. In this example, there is a matching combination of conditions (pattern) shown in Table 1 and associated with the "action/emotion" of "eating/delicious." Thus, the assessor 34 assesses the status of the pet 5 presented in the image data D1 to be "eating/delicious."

On the other hand, suppose the pet information acquired includes the three results, namely, "first distance status," "standing on only hind legs," and "facing toward person." The assessor 34 searches the condition information 9 for any combination of conditions (pattern) that matches these results. In this example, there is a matching combination of conditions (pattern) shown in Table 2 and associated with the "action/emotion" of "showing affection/happy." Thus, the assessor 34 assesses the status of the pet 5 presented in the image data D1 to be "showing affection/happy."

Furthermore, suppose the pet information acquired includes the three results, namely, "third distance status," "standing on four legs and showing teeth," and "facing toward person." The assessor 34 searches the condition information 9 for any combination of conditions (pattern) that matches these results. In this example, there is a matching combination of conditions (pattern) shown in Table 3 and associated with the "action/emotion" of "threatening/angry." Thus, the assessor 34 assesses the status of the pet 5 presented in the image data D1 to be "threatening/angry."

Furthermore, suppose the pet information acquired includes the three results, namely, "second distance status," "standing with one foreleg off floor," and "facing toward toy." The assessor 34 searches the condition information 9 for any combination of conditions (pattern) that matches these results. In this example, there is a matching combination of conditions (pattern) shown in Table 4 and associated with the "action/emotion" of "playing/having fun." Thus, the assessor 34 assesses the status of the pet 5 presented in the image data D1 to be "playing/having fun."

In the exemplary patterns shown in Tables 1-4, each combination of conditions (pattern) is associated with both an action and an emotion. However, this is only an example and should not be construed as limiting. Alternatively, each combination of conditions (pattern) may be associated with only an action or only an emotion. Also, as long as a condition about the "pet's posture" is included, the combination of conditions do not have to be the three conditions (namely, the distance to the object, the pet's posture, and the pet's facing direction). For example, the conditions may include a condition about the "planar area" in which the head area A2 and the object area B1 overlap with each other.

As can be seen, the condition information 9 according to this embodiment includes pieces of facing direction information in which multiple directions that the pet 5 is facing (namely, directions toward the bowl 64, the person, and the toy 63) are associated with multiple pet statuses (namely, eating/delicious, showing affection/happy, and playing/having fun). The assessor 34 assesses the pet status based on the result of determination made by the facing direction determiner 332 and the facing direction information. This enables assessing the status of the pet 5 with increased reliability.

In addition, the condition information 9 according to this embodiment further includes pieces of information in which multiple types of particular objects 6 (namely, the bowl 64, the person, and the toy 63) are associated with multiple threshold values about the distance between the pet 5 and the particular object 6 (for the first, second, and third distance statuses). The assessor 34 assesses the pet status by comparing the result of determination made by the distance determiner 333 with the multiple threshold values. This enables assessing the status of the pet 5 with more reliability. Note that if the pet-object distance determined by the distance determiner 333 is not any one of the first, second, and third distance statuses but a piece of information expressed as a numerical value (e.g., a numerical value corresponding to the number of pixels), then the plurality of threshold values may also be pieces of information expressed as numerical values.

In particular, if the particular object 6 presented in the object area B1 detected by the object detector 36 is the bowl 64 and the distance determined by the distance determiner 333 is equal to or less than a predetermined threshold value, then the assessor 34 assesses the pet's 5 status to be "eating." This assessment is made based on the fact that if the particular object 6 is the bowl 64, the deeper into the bowl 64 the pet 5 puts its nose, the closer to the particular object 6 the pet 5 comes. Thus, if the pet 5 shot in the image data D1 is actually eating, then the pet status is more likely to be assessed to be "eating."

According to this embodiment, even if no particular object 6 is present in the image data D1 and no object area B1 has been detected from the image data D1, the assessor 34 may still assess the pet status. For example, the condition information 9 may include a pattern in which only the pet's posture is associated with at least one of the pet's particular action or particular emotion. Specifically, the pet's posture of "rolling over on the floor with its eyes closed" is associated with the "action/emotion" of "sleeping/restful." Consequently, the assessor 34 assesses, only by the pet's posture, the status of the pet 5 presented in the image data D1 to be "sleeping/restful."

The output interface 35 is configured to output the result of assessment made by the assessor 34 (i.e., the assessed pet status). In particular, in this embodiment, the output interface 35 outputs the result of assessment made by the assessor 34 with the result of assessment associated with the image data D1 in which the specific area A1 that forms the basis of the result of assessment has been detected. The output interface 35 transmits the information in which the result of assessment (e.g., "sleeping/restful") and the image data D1 are associated with each other (hereinafter referred to as "output information") to the presentation device 4 via the communications interface 11. If the user 300 who carries the presentation device 4 with him or her is away from home, the output information may be transmitted to the presentation device 4 via the server 7. The output information preferably further includes information about the time when the image data D1 that forms the basis of the result of assessment has been captured by the image capture device 2.

The output information is preferably stored in, for example, a memory built in the pet camera 100. Alternatively, the output information may also be transmitted to, and stored in, the server 7 or any other peripheral device.

On receiving the output information from the pet camera 100, the presentation device 4 may replace the pet status included in the output information with, for example, a simple expression (message) and present the message on the screen as, for example, a push notification carrying the message. When the user 300 opens the push notification received, the presentation device 4 may start the pet app and present, on the screen, a specific pet status including the image data D1 (refer to FIGS. 7A and 7B). Alternatively, the output information may also be sent as an email to the recipient via an email server.

Figure 7A:
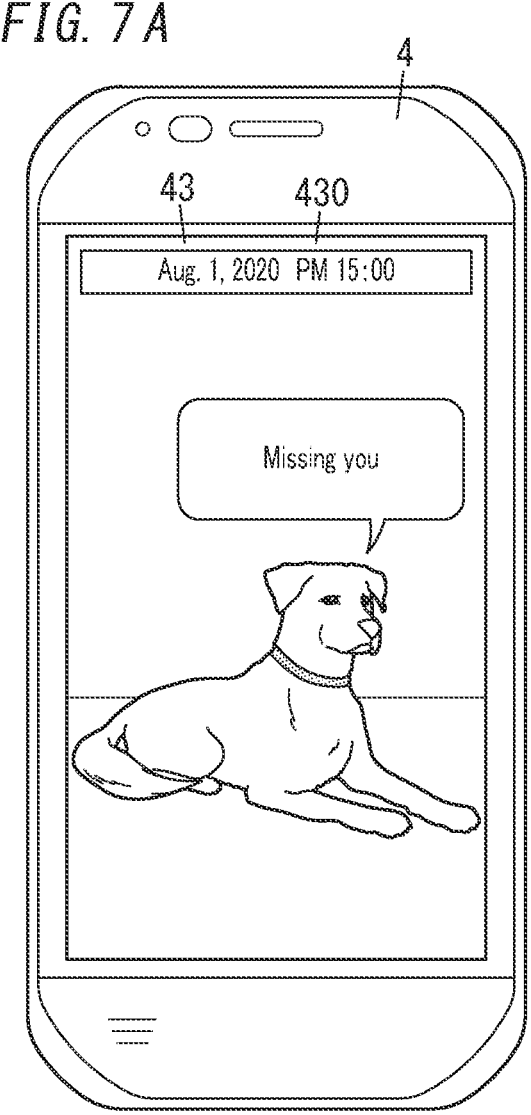
FIGS. 7A and 7B are conceptual diagrams illustrating a presentation device on which a result of assessment made by the pet status assessment system is presented on its screen.

In the example shown in FIG. 7A, the presentation device 4 displays, on the screen 430 of the display device 43, the image data D1 that forms the basis of the pet status assessment (refer to FIG. 3C; posture of lying down on the floor). In this case, the condition information 9 includes a pattern in which the two conditions, namely, "no particular object detected" and "posture of lying down on the floor" are associated with the emotion of "lonely." Thus, this is an example in which the pet status is assessed to be "lonely." The presentation device 4 converts the pet's 5 emotion of "lonely" into a more informal expression "Missing you" and displays character string data including the expression in a balloon as a superimposed image on the image data D1.

Figure 7B:
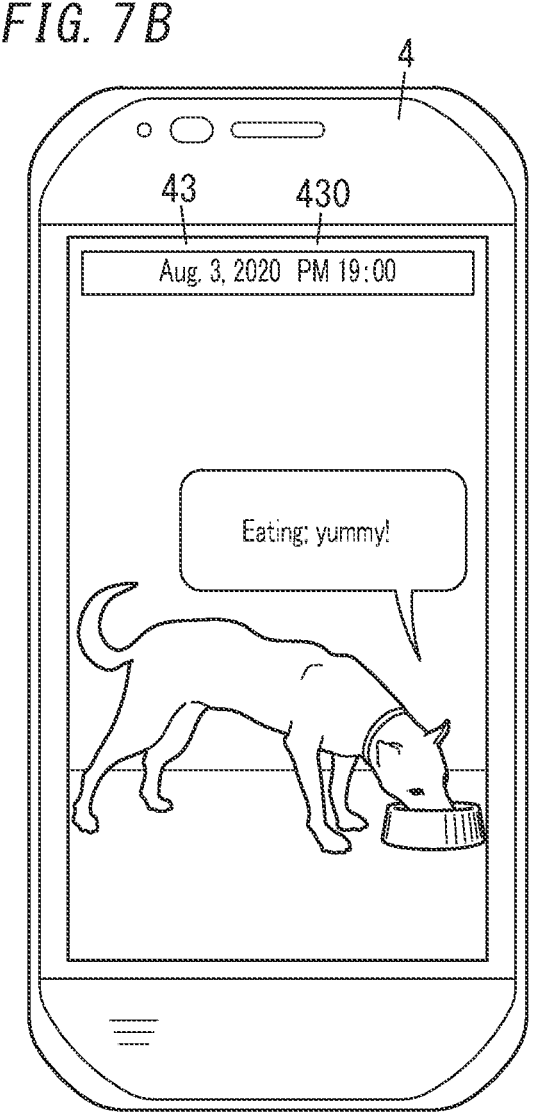

On the other hand, in the example shown in FIG. 7B, the presentation device 4 displays, on the screen 430 of the display device 43, the image data D1 that forms the basis of the pet status assessment (refer to FIG. 6; posture of standing on all four legs and lowering the head region). In this case, the condition information 9 includes a pattern in which the three conditions, namely, "first distance status," "standing on four legs and lowering the head region," and "facing toward the bowl" are associated with the "action/emotion" of "eating/delicious." Thus, this is an example in which the pet status is assessed to be "eating/delicious." The presentation device 4 converts the pet's 5 emotion of "delicious" into a more informal expression "yummy" and displays character string data including the word "eating" and the informal expression in a balloon as a superimposed image on the image data D1.

Note that the presentation device 4 preferably further displays, on the screen 430 of the display device 43, the date and time when the image data D1 was captured.

The output interface 35 does not have to transmit the output information including the image data D1 (original data) that forms the basis of the result of assessment but may transmit the output information after having processed the image data. Still alternatively, the output interface 35 may transmit the output information after having replaced the image data D1 with an icon image corresponding to the pet status assessed (e.g., an icon image representing a dog that appears to be lonely while shedding tears). The data processing and replacement of the image data D1 with the icon image may be performed by either the presentation device 4 or the server 7, whichever is appropriate.

The result of assessment made by the assessor 34 does not have to be output as an on-screen image but may also be output as a voice message either instead of, or in addition to, the on-screen image.

The processing device 3 performs assessment processing every time the acquirer 31 acquires the image data D1. For example, if the image capture device 2 captures still pictures at predetermined intervals (of either a few minutes or a few ten minutes, for example), then the processing device 3 may perform the assessment processing generally at the predetermined intervals. Alternatively, if the image capture device 2 captures a moving picture at a predetermined frame rate, then the processing device 3 may perform the assessment processing by acquiring, as the image data D1, a plurality of frame pictures which are continuous with each other in the moving picture, at constant intervals (of either a few minutes or a few ten minutes, for example). The output interface 35 may transmit the output information to the presentation device 4 every time the assessor 34 assesses the pet status with respect to a single frame of the image data D1. Alternatively, after the output information has been pooled to a certain degree in, for example, a memory built in the pet camera 100, the output interface 35 may transmit the output information collectively.

Also, if the results of assessment made by the assessor 34 with respect to multiple frames of the image data D1 indicate that the pet 5 is assuming the posture of facing the same direction a predetermined number of times (e.g., twice) successively, then the output interface 35 may restrict the output of the result of assessment made by the assessor 34. Specifically, suppose a situation where the posture and facing direction of the pet 5 with respect to one frame of the image data D1 have been determined to be "standing on four legs and lowering the head region" and "facing toward the bowl" (i.e., making the action of "eating") and output information indicating to that effect has been output to the presentation device 4. In that case, if the posture and facing direction of the pet 5 with respect to multiple following frames of the image data D1 that have been acquired after the one frame are determined to be the same as the ones with respect to the one frame of the image data D1, then the output interface 35 does not have to output such results of assessment. If multiple pieces of output information are pooled in a built-in memory, for example, and the output information indicates the same results of assessment a predetermined number of times successively, then the output interface 35 may transmit such pieces of output information collectively as a single result of assessment. The setting about the "predetermined number of times" may be changed as appropriate in accordance with the user's 300 operating command entered into either the pet camera 100 or the presentation device 4.

Restricting the output of the results of assessment in this manner may reduce the chances of similar results of assessment being output consecutively, thus contributing to lightening the processing load and reducing the communication traffic. In addition, this also reduces the chances of the user 300 being notified of the same pet status (e.g., "eating") repeatedly during a short period of time, thus improving the user-friendliness of the pet status assessment system 1 as well.

(2.3) Description of Operation

Next, it will be described briefly with reference to FIGS. 8 and 9 how the pet management system 200 according to this embodiment operates. Note that the order in which the respective processing steps are performed in the following description of operation is only an example and should not be construed as limiting. In the following description, an example in which the pet detector X1 performs the specific area A1 detection processing step and the pet information generation processing step in this order will be described. However, this is only an example and should not be construed as limiting. Alternatively, these two processing steps may also be performed substantially concurrently.

The pet camera 100 installed in the dwelling facility of the user 300 monitors a predetermined management region in which the pet 5 will act mainly by capturing an image of the predetermined management region using the image capture device 2. The pet camera 100 may either capture a still picture of the management region at predetermined intervals or shoot a moving picture of the management region continuously for a predetermined period.

As shown in FIG. 8, on acquiring the image data D1 (which may be either a still picture or one frame of a moving picture) captured by the image capture device 2 (in S1), the pet status assessment system 1 of the pet camera 100 performs assessment processing (in S2).

The pet status assessment system 1 makes the area detector 32 determine, using the second model M2, whether or not any dog (as a type of pet 5) has been shot as a subject H1 in the image data D1 (in S3). When finding that a dog (as a type of pet 5) has been shot (if the answer is YES in S3), the pet status assessment system 1 detects a specific area A1 representing the pet 5 (in S4: pet detection step) and then the process proceeds to the step of determining whether or not a head region 50 has been shot (in S5).

In this embodiment, even if a decision has been made that no dog (as a type of pet 5) have been shot in the image data D1 (if the answer is NO in S3), the process also proceeds to the step of determining whether or not the head region 50 has been shot (S5). This measure is taken to deal with a failure about the detection of the dog in a situation where the image data D1 is a closeup of the dog's face as described above.

The pet status assessment system 1 makes the area detector 32 determine, using the third model M3, whether or not the head region 50 of the dog (as a type of pet 5) has been shot in the image data D1 (in S5). When deciding that the head region 50 have been shot (if the answer is YES in S5), the pet status assessment system 1 detects a head area A2 representing the head region 50 (in S6). In this embodiment, unless the head region 50 has been shot (if the answer is NO in S5), the pet status assessment system 1 ends the assessment processing on this image data D1 and waits for acquisition of the next image data D1 (i.e., the process goes back to S1). Nevertheless, as long as a specific area A1 has been detected, the pet status assessment system 1 may continue performing the assessment processing even if no head area A2 has been detected.

Figure 9:
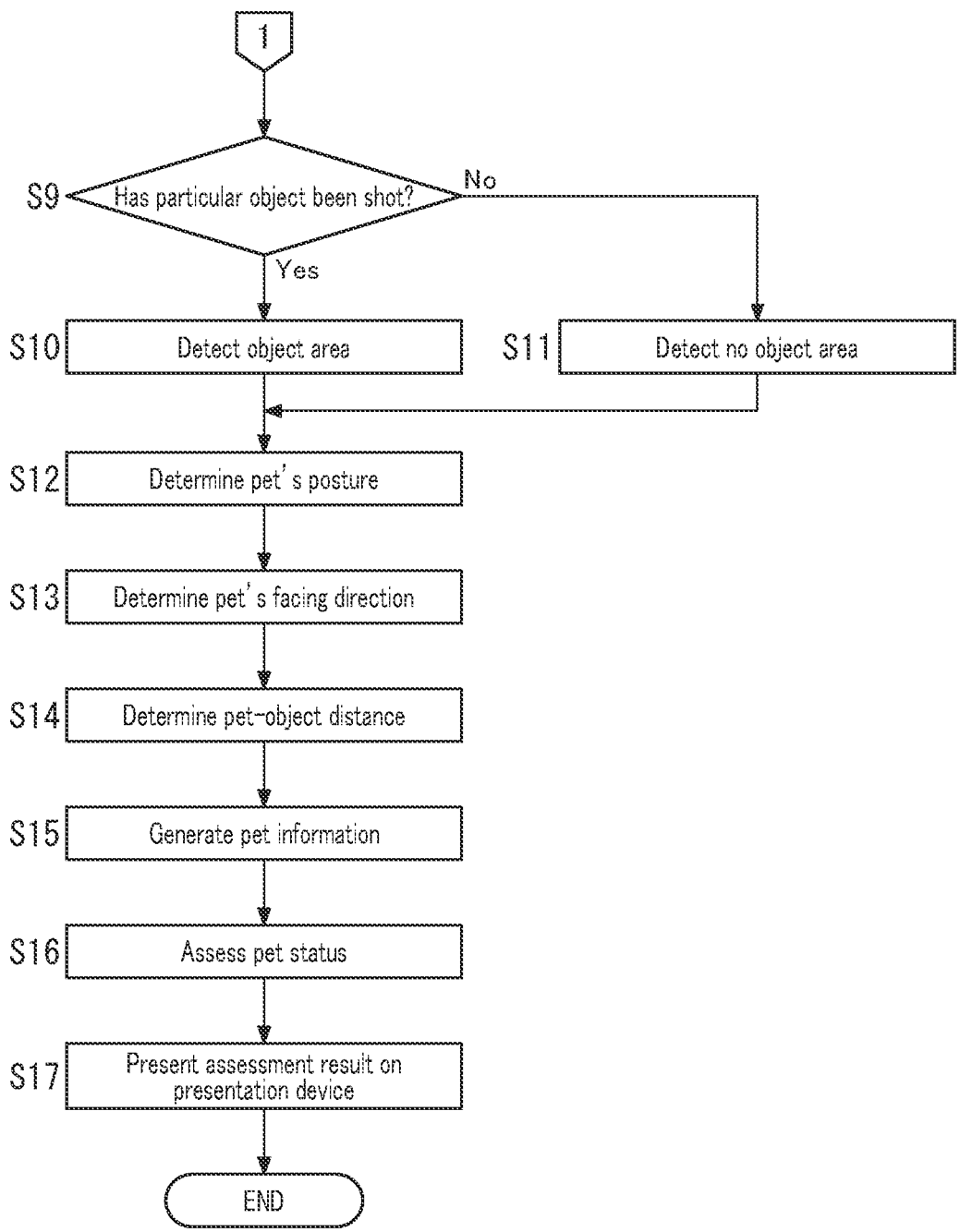
FIG. 9 is a flowchart showing the exemplary operation of the pet status assessment system.

If the pet status assessment system 1 has detected the specific area A1 after having detected the head area A2 (if the answer is YES in S7), then the process proceeds to the step of determining whether or not any particular object 6 has been shot (S9; refer to FIG. 9). On the other hand, if the pet status assessment system 1 has detected no specific area A1 after having detected the head area A2 (if the answer is NO in S7), then the pet status assessment system 1 sets an area substantially equal in size to the head area A2 as the specific area A1 (in S8) and the process proceeds to the step of determining whether or not any particular object 6 has been shot (S9).

The pet status assessment system 1 makes the object detector 36 determine, using the fourth model M4, whether or not any particular object 6 has been shot in the image data D1 as shown in FIG. 9 (in S9). When deciding that a particular object 6 have been shot (if the answer is YES in S9), the pet status assessment system 1 detects an object area B1 representing the particular object 6 (in S10) and the process proceeds to the step of determining the posture (in S12). On the other hand, when deciding that no particular object 6 have been shot (if the answer is NO in S9), the pet status assessment system 1 decides that no object area B1 have been detected (in S11) and the process proceeds to the step of determining the posture (S12).

The pet status assessment system 1 makes the posture determiner 331 determine, based on the first model M1 and information about the specific area A1, the posture of the dog (as a type of pet 5) (in S12).

Next, the pet status assessment system 1 makes the direction determiner 332 determine, based on the information about the specific area A1 and information about the head area A2, the direction that the pet 5 is facing (in S13).

In addition, the pet status assessment system 1 also makes the distance determiner 333 determine, based on the information about the head area A2, information about the object area B1, and posture information, the distance between the pet and the object (in S14). Note that if no object area B1 has been detected, this processing step S14 is skipped.

The pet status assessment system 1 generates pet information based on the results of determination made in the processing steps S12-S14 (in S15: information generation step).

Then, the pet status assessment system 1 assesses the pet status based on the pet information and the condition information 9 (in S16: assessment step).

The pet status assessment system 1 transmits output information, in which the pet status thus assessed and the image data D1 are associated with each other, to the presentation device 4 and makes the presentation device 4 present the output information (in S17).

Advantages

As can be seen from the foregoing description, in the pet status assessment system 1, the assessor 34 assesses, based on the pet information, a pet status concerning an emotion and/or action of the pet 5, thus eventually making it easier to recognize the pet's status.

In addition, the pet status assessment system 1 according to this embodiment includes the facing direction determiner 332 that determines a direction that the pet 5 is facing in the image data D1. This may increase the reliability of assessment of the pet's status by taking the direction that the pet 5 is facing into account. Furthermore, the facing direction determiner 332 determines, based on a relative location of the head area A2 with respect to the specific area A1, the direction that the pet 5 is facing. This may increase the reliability of determination about the direction that the pet 5 is facing.

Furthermore, the output interface 35 outputs a result of assessment made by the assessor 34 with the result of assessment associated with the image data D1 in which the specific area A1 that forms the basis of the result of assessment has been detected. This makes even easier to recognize the pet's status.

Among other things, this pet status assessment system 1 allows the user 300 to recognize the pet's 5 action and/or emotion more easily based on the pet's status assessed by the pet status assessment system 1, thus making it easier for the user 300 to communicate more smoothly with his or her own pet 5. In addition, this pet status assessment system 1 also makes it easier for the user 300 to recognize, based on the notification made by the presentation device 4, the pet's 5 action and/or emotion inside the dwelling facility and thereby manage (watch) the pet 5 attentively even while the user 300 is away from home. This enables, particularly when the pet status assessed indicates that the pet 5 is making an alarming action (e.g., the pet 5 is not feeling well or languished), notifying the user 300 of such emergency situation promptly.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Also, the functions of the pet status assessment system 1 according to the embodiment described above may also be implemented as, for example, a pet status assessment method, a computer program, or a non-transitory storage medium that stores the computer program thereon.

Next, variations of the exemplary embodiment will be enumerated one after another. Note that some of the variations to be described below may be adopted as appropriate in combination. In the following description, the exemplary embodiment described above will be hereinafter sometimes referred to as a "basic example."

The pet status assessment system 1 according to the present disclosure includes a computer system. The computer system may include a processor and a memory as principal hardware components thereof. The functions of the pet status assessment system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

In the exemplary embodiment described above, the plurality of functions of the pet status assessment system 1 are aggregated together in a single housing. However, this is not an essential configuration for the pet status assessment system 1. For example, constituent elements of the pet status assessment system 1 may be distributed in multiple housings. Specifically, at least some learned models out of the first to fourth models M1-M4 of the pet status assessment system 1 may be provided outside of the pet camera 100 (e.g., provided in an external server such as the server 7).

Conversely, the plurality of functions of the pet status assessment system 1 may be aggregated together in a single housing (i.e., the housing of the pet camera 100) as in the basic example described above. Furthermore, at least some functions of the pet status assessment system 1 (e.g., some functions of the pet status assessment system 1) may also be implemented as a cloud computing system, for example.

(3.1) First Variation

Figure 10:
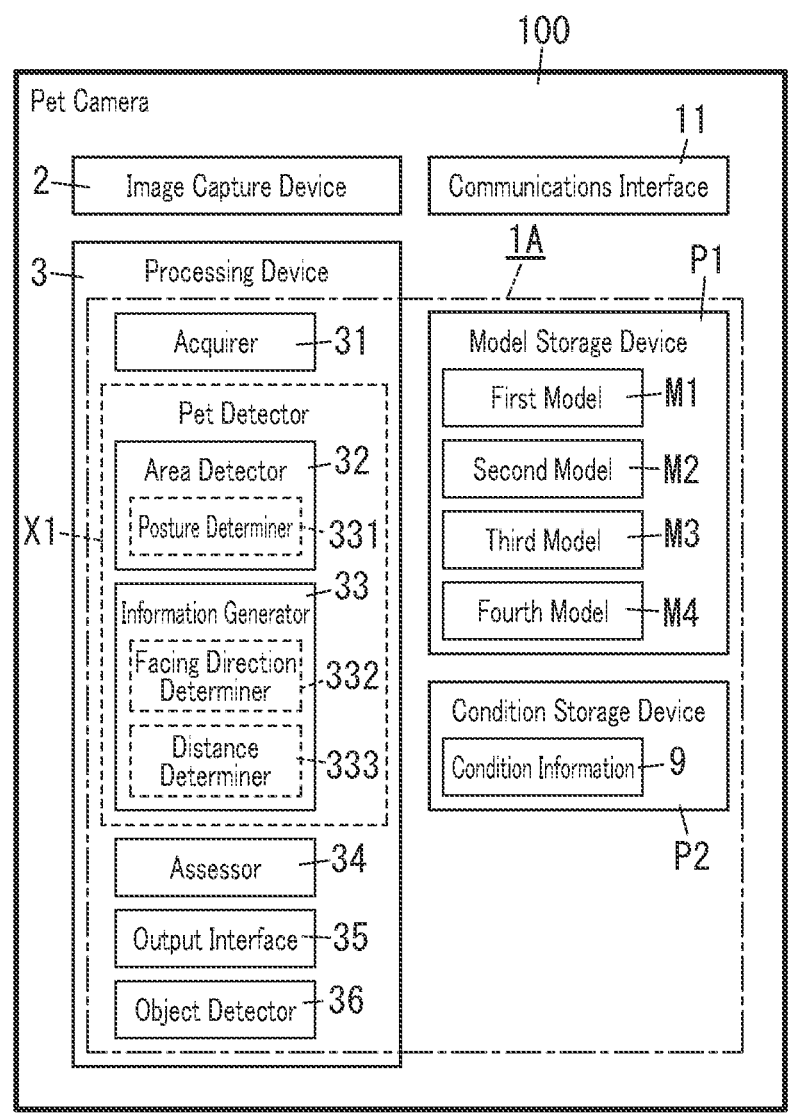
FIG. 10 illustrates a schematic configuration for a pet camera to which a variation of the pet status assessment system is applied.

Next, a first variation of the present disclosure will be described with reference to FIG. 10. FIG. 10 illustrates a pet status assessment system 1A according to this variation. In the following description, any constituent element of this first variation, having substantially the same function as a counterpart of the pet status assessment system 1 according to the basic example described above, will be designated by the same reference numeral as that counterpart's, and description thereof will be herein omitted as appropriate.

In the pet status assessment system 1 according to the basic example described above, the pet detector X1 includes the area detector 32 and the information generator 33 and makes the area detector 32 detect the pet 5 and then makes the posture determiner 331 of the information generator 33 determine the posture of the pet 5 to generate the posture information. That is to say, the presence or absence of the pet 5 in/from the image data D1 acquired is detected first, and then its posture is determined.

In the pet status assessment system 1A according to this variation, the area detector 32 has the function of the posture determiner 331 as shown in FIG. 10, which is a difference from the pet status assessment system 1 according to the basic example.

In this variation, the area detector 32 detects, based on the first model M1 generated by learning the posture of the pet to recognize, on the image, the posture of the pet, a specific area A1 of the pet 5 assuming a particular posture from the image data D1. In this variation, the area detector 32 determines, using the first through fourth models M1-M4, for example, whether or not the pet 5 assuming the particular posture has been shot as a subject H1 in the image data D1, thereby detecting the specific area A1 representing the pet 5 assuming the particular posture. As used herein, the "particular posture" refers to a posture correlated to an action deeply associated with the dog's emotion as described above. Examples of the particular posture include sitting, lying down, rolling over the floor, and standing up on four legs.

Information about the specific area A1 representing the pet 5 assuming the particular posture is input to the information generator 33 and used by the facing direction determiner 332 to determine the facing direction and also used by the distance determiner 333 to determine the distance.

In short, the pet detector X1 according to this variation is configured to detect a pet 5 assuming a particular posture rather than detecting the presence of the pet 5 and then determining its posture.

The configuration of this variation also makes it easier to recognize the status of the pet 5.

(3.2) Other Variations

Next, other variations will be enumerated one after another.

In the basic example described above, the assessor 34 assesses the pet status based on the pet information and the condition information 9. However, this is only an example and should not be construed as limiting. Alternatively, the assessor 34 may assess the pet status using, instead of the condition information 9, not only the pet information but also a learned model (classifier) generated by making machine learning the pet's particular action and/or particular emotion. On receiving the pet information, the classifier classifies the pet information into the pet's particular action and/or particular emotion.

In the basic example described above, the number of the dog (as a type of pet 5) shot as a subject H1 in a single frame of the image data D1 is supposed to be one. Naturally, however, two or more dogs (as a type of pet 5) (e.g., two dogs as a pair of a parent dog and or its puppy dog) may have been shot as subjects H1 in a single frame of the image data D1. If the pet status assessment system 1 has detected a plurality of specific areas A1 in a single frame of the image data D1, then the pet status assessment system 1 generates pet information with respect to each of the plurality of specific areas A1 and assesses the pet status.

In the basic example described above, the number of the particular object 6 shot, other than the pet 5, in a single frame of the image data D1 is supposed to be either zero or one. Naturally, however, the number of the particular objects 6 shot in a single frame of the image data D1 may also be two or more. If the pet status assessment system 1 has detected multiple object areas B1 in a single frame of the image data D1, then the pet status assessment system 1 determines the distance between the pet 5 and each of the multiple object areas B1. In that case, the pet status assessment system 1 may assess the pet status by selecting one object area B1, which is located at the shortest distance from the pet 5, from a plurality of pet-object distances.

In the basic example described above, the pet status assessment system 1 has the function of determining the facing direction of the pet 5 (i.e., the facing direction determiner 332) and the function of determining the pet-object distance (i.e., the distance determiner 333). However, these functions are not essential ones but may be omitted as appropriate.

At least some of the first to fourth models M1-M4 in the basic example may be machine-learned by reinforcement learning. In that case, considering the processing load for reinforcement learning, those models are preferably provided outside of the pet camera 100 (e.g., in an external server such as the server 7).

(4) Recapitulation

As can be seen from the foregoing description, a pet status assessment system (1, 1A) according to a first aspect includes an area detector (32), an information generator (33), and an assessor (34). The area detector (32) detects, in image data (D1), a specific area (A1) representing at least a part of appearance of a pet (5) as a subject (H1). The information generator (33) generates pet information. The pet information includes posture information about at least a posture of the pet (5). The posture information is based on a learned model (first model M1) and the image data (D1). The learned model (first model M1) has been generated by learning the posture of the pet to recognize, on an image, the posture of the pet. The assessor (34) assesses, based on the pet information, a pet status concerning at least one of an emotion of the pet (5) presented in the specific area (A1) or an action of the pet (5) presented in the specific area (A1). According to the first aspect, the assessor (34) assesses, based on the pet information, a pet status concerning an emotion and/or action of the pet (5), thus eventually making it easier to recognize the status of the pet (5).

In a pet status assessment system (1, 1A) according to a second aspect, which may be implemented in conjunction with the first aspect, the assessor (34) assesses the pet status based on the pet information and condition information (9) about at least one of a particular action of the pet or a particular emotion of the pet. The second aspect enables implementing a pet status assessment system (1, 1A) in a simpler configuration than in a situation where the pet status is assessed using a learned model generated by machine learning, for example.

In a pet status assessment system (1, 1A) according to a third aspect, which may be implemented in conjunction with the first or second aspect, the area detector (32) detects the specific area (A1) based on a learned model (second model M2). The learned model (second model M2) has been generated by learning an appearance factor of a predetermined type of pet to recognize, on the image, the predetermined type of pet. The third aspect increases the reliability of detection of the specific area (A1), thus eventually increasing the reliability of assessment of the pet's (5) status.

In a pet status assessment system (1, 1A) according to a fourth aspect, which may be implemented in conjunction with any one of the first to third aspects, the area detector (32) detects, based on a learned model (third model M3), a head area (A2) representing a head region (50) of the subject (H1). The learned model (third model M3) has been generated by learning an appearance factor of the head region of a predetermined type of pet to recognize, on the image, the head region of the predetermined type of pet. The fourth aspect increases the reliability of detection of the head area (A2), thus eventually increasing the reliability of assessment of the pet's (5) status.

In a pet status assessment system (1, 1A) according to a fifth aspect, which may be implemented in conjunction with the fourth aspect, the information generator (33) includes a facing direction determiner (332) that determines, based on the image data (D1) in which the specific area (A1) has been detected, a direction that the pet (5) is facing in the image data (D1). The pet information further includes a result of determination made by the facing direction determiner (332). The fifth aspect may increase the reliability of assessment of the pet's (5) status by taking the direction that the pet (5) is facing into account.

In a pet status assessment system (1, 1A) according to a sixth aspect, which may be implemented in conjunction with the fifth aspect, the facing direction determiner (332) determines, based on at least a relative location of the head area (A2) with respect to the specific area (A1), the direction that the pet (5) is facing. The sixth aspect may increase the reliability of determination about the direction that the pet (5) is facing.

In a pet status assessment system (1, 1A) according to a seventh aspect, which may be implemented in conjunction with the fifth or sixth aspect, the assessor (34) assesses the pet status based on the pet information and condition information (9) about at least one of a particular action of the pet or a particular emotion of the pet. The condition information (9) includes facing direction information in which a plurality of directions that the pet (5) is facing and a plurality of pet statuses are associated with each other. The assessor (34) assesses the pet status based on a result of determination made by the facing direction determiner (332) and the facing direction information. The seventh aspect may increase the reliability of assessment of the pet's (5) status.

A pet status assessment system (1, 1A) according to an eighth aspect, which may be implemented in conjunction with any one of the fifth to seventh aspects, further includes an output interface (35) that outputs results of assessment made by the assessor (34). The output interface (35) restricts, when the results of assessment made by the assessor (34) with respect to multiple frames of the image data (D1) indicate that the pet (5) is facing an identical direction successively a predetermined number of times, outputting the results of assessment made by the assessor (34). The eighth aspect may reduce the chances of outputting similar assessment results successively, thus contributing to reducing the processing load, for example.

A pet status assessment system (1, 1A) according to a ninth aspect, which may be implemented in conjunction with any one of the first to eighth aspects, further includes an object detector (36) that detects an object area (B1) representing, in the image data (D1), a particular object (6) other than the pet (5). The information generator (33) includes a distance determiner (333) that determines a relative distance of the pet (5) with respect to the object area (B1). The pet information further includes a result of determination made by the distance determiner (333). The assessor (34) assesses the pet status based on the pet information and condition information (9) about at least one of a particular action of the pet or a particular emotion of the pet. The condition information (9) includes information in which multiple types of particular objects and a plurality of threshold values about distances between the pet and the multiple types of particular objects are associated with each other. The assessor (34) assesses the pet status by comparing a result of determination made by the distance determiner (333) with the plurality of threshold values. The ninth aspect may increase the reliability of assessment of the pet's (5) status by taking the relative distance of the specific area (A1) with respect to the object area (B1) into account.

In a pet status assessment system (1, 1A) according to a tenth aspect, which may be implemented in conjunction with the ninth aspect, the object detector (36) detects the object area (B1) based on a learned model (fourth model M4). The learned model (fourth model M4) has been generated by learning an appearance factor of a predetermined type of particular object to recognize, on the image, the predetermined type of particular object. The tenth aspect increases the reliability of detection of the object area (B1).

In a pet status assessment system (1, 1A) according to an eleventh aspect, which may be implemented in conjunction with the ninth or tenth aspect, when the particular object (6) presented in the object area (B1) detected by the object detector (36) is a bowl (64) and the relative distance determined by the distance determiner (333) is equal to or less than a predetermined threshold value, the assessor (34) assesses the pet status concerning the action of the pet (5) to be eating. The eleventh aspect may increase, when the pet (5) presented in the image data (D1) is actually eating, the chances of assessing the pet status to be eating as well.

A pet status assessment system (1, 1A) according to a twelfth aspect, which may be implemented in conjunction with any one of the first to eleventh aspects, further includes an output interface (35). The output interface (35) outputs a result of assessment made by the assessor (34) while associating the result of assessment with the image data (D1) in which the specific area (A1) that forms a basis of the result of assessment has been detected. The twelfth aspect may make it even easier to recognize the pet's (5) status.

In a pet status assessment system (1, 1A) according to a thirteenth aspect, which may be implemented in conjunction with any one of the first to twelfth aspects, the area detector (32) detects, based on a learned model (first model M1), the specific area (A1) of the pet (5) assuming a particular posture in the image data (D1). The learned model (first model M1) has been generated by learning the posture of the pet to recognize, on the image, the posture of the pet. The thirteenth aspect may make it even easier to recognize the pet's (5) status.

A pet camera (100) according to a fourteenth aspect includes: the pet status assessment system (1, 1A) according to any one of the first to thirteenth aspects; and an image capture device (2) that captures the image data (D1). The fourteenth aspect may provide a pet camera (100) that may make it easier to recognize the pet's (5) status.

A server (7) according to a fifteenth aspect may communicate with a pet camera (100) equipped with the information generator (33) and the assessor (34) of the pet status assessment system (1, 1A) according to any one of the first to thirteenth aspects. The server (7) is equipped with the area detector (32). The fifteenth aspect may provide a server (7) that may make it easier to recognize the pet's (5) status.

A server (7) according to a sixteenth aspect may communicate with a pet camera (100) equipped with the area detector (32) of the pet status assessment system (1, 1A) according to any one of the first to thirteenth aspects. The server (7) is equipped with the information generator (33) and the assessor (34). The sixteenth aspect may provide a server (7) that may make it easier to recognize the pet's (5) status.

A pet status assessment method according to a seventeenth aspect includes a pet detection step, an information generation step, and an assessment step. The pet detection step includes detecting, in image data (D1), a specific area (A1) representing at least a part of appearance of a pet (5) as a subject (H1). The information generation step includes generating pet information. The pet information includes posture information about at least a posture of the pet (5). The posture information is based on a learned model (first model M1) and the image data (D1). The learned model (first model M1) has been generated by learning the posture of the pet to recognize, on an image, the posture of the pet. The assessment step includes assessing, based on the pet information, a pet status concerning at least one of an emotion of the pet (5) presented in the specific area (A1) or an action of the pet (5) presented in the specific area (A1). The seventeenth aspect may provide a pet status assessment method that may make it easier to recognize the pet's (5) status.

A program according to an eighteenth aspect is designed to cause one or more processors to perform the pet status assessment method according to the seventeenth aspect. The eighteenth aspect may provide a function that may make it easier to recognize the pet's (5) status.

Note that the constituent elements according to the second to thirteenth aspects are not essential constituent elements for the pet status assessment system (1, 1A) but may be omitted as appropriate.

REFERENCE SIGNS LIST

100 Pet Camera
1, 1A Pet Status Assessment System
2 Image Capture Device
32 Area Detector
33 Information Generator
332 Facing Direction Determiner
333 Distance Determiner
34 Assessor
35 Output Interface
36 Object Detector
5 Pet
50 Head Region
6 Particular Object
7 Server
64 Bowl
9 Condition Information
A1 Specified Area
A2 Head Area
B1 Object Area
D1 Image Data
H1 Subject
M1-M4 First to Fourth Models (Learned Models)

The invention claimed is:

1. A pet status assessment system comprising:
an area detector configured to detect, in image data, a specific area representing at least a part of appearance of a pet as a subject;
an information generator configured to generate pet information including posture information about at least a posture of the pet, the posture information being based on a learned model and the image data, the learned model having been generated by learning the posture of the pet to recognize, on an image, the posture of the pet;
an assessor configured to assess, based on the pet information, a pet status concerning at least one of an emotion of the pet presented in the specific area or an action of the pet presented in the specific area; and
an object detector configured to detect an object area representing, in the image data, a particular object other than the pet, wherein:
the information generator includes a distance determiner configured to determine a relative distance of the pet with respect to the object area based on:
information about the specific area detected by the area detector;
information about the object area detected by the object detector; and
the posture information,
the pet information further includes a result of determination made by the distance determiner,
the assessor is configured to assess the pet status based on the pet information and condition information about at least one of a particular action of the pet or a particular emotion of the pet,
the condition information includes information in which multiple types of particular objects and a plurality of threshold values about distances between the pet and the multiple types of particular objects are associated with each other, and
the assessor is configured to assess the pet status by comparing a result of determination made by the distance determiner with the plurality of threshold values.

2. The pet status assessment system of claim 1, wherein the area detector is configured to detect the specific area based on a learned model, the learned model having been generated by learning an appearance factor of a predetermined type of pet to recognize, on the image, the predetermined type of pet.

3. The pet status assessment system of claim 1, wherein the area detector is configured to detect, based on a learned model, a head area representing a head region of the subject, the learned model having been generated by learning an appearance factor of the head region of a predetermined type of pet to recognize, on the image, the head region of the predetermined type of pet.

4. The pet status assessment system of claim 3, wherein the information generator includes a facing direction determiner configured to determine, based on the image data in which the specific area has been detected, a direction that the pet is facing in the image data, and the pet information further includes a result of determination made by the facing direction determiner.

5. The pet status assessment system of claim 4, wherein the facing direction determiner is configured to determine, based on at least a relative location of the head area with respect to the specific area, the direction that the pet is facing.

6. The pet status assessment system of claim 4, wherein the condition information includes facing direction information in which a plurality of directions that the pet is facing and a plurality of pet statuses are associated with each other, and the assessor is configured to assess the pet status based on a result of determination made by the facing direction determiner and the facing direction information.

7. The pet status assessment system of claim 4, further comprising an output interface configured to output results of assessment made by the assessor, wherein the output interface is configured to, when the results of assessment made by the assessor with respect to multiple frames of the image data indicate that the pet is facing an identical direction successively a predetermined number of times, restrict outputting the results of assessment made by the assessor.

8. The pet status assessment system of claim 1, wherein the object detector is configured to detect the object area based on a learned model, the learned model having been generated by learning an appearance factor of a predetermined type of particular object to recognize, on the image, the predetermined type of particular object.

9. The pet status assessment system of claim 1, wherein the assessor is configured to, when the particular object presented in the object area detected by the object detector is a bowl and the relative distance determined by the distance determiner is equal to or less than a predetermined threshold value, assess the pet status concerning the action of the pet to be eating.

10. The pet status assessment system of claim 1, further comprising an output interface configured to output a result of assessment made by the assessor while associating the result of assessment with the image data in which the specific area that forms a basis of the result of assessment has been detected.

11. The pet status assessment system of claim 1, wherein the area detector is configured to detect, based on a learned model, the specific area of the pet assuming a particular posture in the image data, the learned model having been generated by learning the posture of the pet to recognize, on the image, the posture of the pet.

12. A pet camera comprising:
the pet status assessment system of claim 1; and
an image capture device configured to capture the image data.

13. A server configured to communicate with a pet camera, the pet camera being equipped with the information generator and the assessor of the pet status assessment system of claim 1,
the server being equipped with the area detector.

14. A server configured to communicate with a pet camera, the pet camera being equipped with the area detector of the pet status assessment system of claim 1,
the server being equipped with the information generator and the assessor.

15. A pet status assessment method comprising:
a pet detection step including detecting, in image data, a specific area representing at least a part of appearance of a pet as a subject;
an information generation step including generating pet information including posture information about at least a posture of the pet, the posture information being based on a learned model and the image data, the learned model having been generated by learning the posture of the pet to recognize, on an image, the posture of the pet;
an assessment step including assessing, based on the pet information, a pet status concerning at least one of an emotion of the pet presented in the specific area or an action of the pet presented in the specific area; and
an object detection step including detecting an object area representing, in the image data, a particular object other than the pet, wherein:
the information generation step includes a distance determination step including determining a relative distance of the pet with respect to the object area based on:
information about the specific area detected in the pet detection step;
information about the object area detected in the object detection step; and
the posture information,
the pet information further includes a result of determination made in the distance determination step,
the assessment step includes assessing the pet status based on the pet information and condition information about at least one of a particular action of the pet or a particular emotion of the pet,
the condition information includes information in which multiple types of particular objects and a plurality of threshold values about distances between the pet and the multiple types of particular objects are associated with each other, and
the assessment step includes assessing the pet status by comparing a result of determination made in the distance determination step with the plurality of threshold value.

16. A non-transitory storage medium that stores a program designed to cause one or more processors to perform the pet status assessment method of claim 15.

* * * * *